US011873210B2

(12) United States Patent
Clever

(10) Patent No.: US 11,873,210 B2
(45) Date of Patent: *Jan. 16, 2024

(54) BREAKAWAY ASSEMBLY

(71) Applicant: OPW Fueling Components, LLC, Hamilton, OH (US)

(72) Inventor: Bryan William Clever, Liberty Township, OH (US)

(73) Assignee: OPW FUELING COMPONENTS, LLC, Hamilton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/093,013

(22) Filed: Jan. 4, 2023

(65) Prior Publication Data

US 2023/0141263 A1 May 11, 2023

Related U.S. Application Data

(63) Continuation of application No. 17/005,708, filed on Aug. 28, 2020, now Pat. No. 11,597,645.

(51) Int. Cl.
*B67D 7/52* (2010.01)
*B67D 7/78* (2010.01)

(52) U.S. Cl.
CPC .......... *B67D 7/52* (2013.01); *B67D 7/78* (2013.01); *B67D 2210/00144* (2013.01)

(58) Field of Classification Search
CPC ......... B67D 7/52; B67D 7/78; F16L 55/1015; F16L 37/30; F16L 37/32; F16L 37/35
See application file for complete search history.

(56) References Cited

U.S. PATENT DOCUMENTS

| | | | |
|---|---|---|---|
| 2,793,057 A | 5/1957 | McGugin |
| 2,953,970 A | 9/1960 | Maynard |
| 3,234,965 A | 9/1962 | Anderson |
| 3,181,895 A | 5/1965 | Cator |
| 3,586,048 A | 6/1971 | Arnold |
| 3,741,521 A | 6/1973 | Tatsuno |
| 3,761,117 A | 9/1973 | Shendure |

(Continued)

OTHER PUBLICATIONS

European Patent Office, extended European Search Report dated Jun. 13, 2022 which pertains to European Patent Application No. 211934351. 14 pages.

(Continued)

*Primary Examiner* — Timothy L Maust
(74) *Attorney, Agent, or Firm* — Thompson Hine LLP

(57) ABSTRACT

A breakaway assembly including a first connector and a second connector releasably coupleable to the first connector, wherein the assembly is movable between a first configuration in which the first and second connectors are releasably coupled and together define a fluid path through which fluid is flowable, wherein the fluid path includes an at least partially radially extending portion, and a second configuration in which the first and second connectors are not coupled together. The assembly is configured to move from the first configuration to the second configuration when a predetermined separation force is applied to the assembly. One of the first or second connectors has a shaft which defines or includes at least part of the fluid path therein, and the at least partially radially extending portion includes or is defined by an opening in the shaft.

28 Claims, 21 Drawing Sheets

(56) References Cited

U.S. PATENT DOCUMENTS

| | | | |
|---|---|---|---|
| 4,067,810 A | | 1/1978 | Sullivan |
| 4,557,582 A | | 12/1985 | Kan et al. |
| 4,917,149 A | * | 4/1990 | Grantham ............ B67D 7/3218 |
| | | | 137/614.03 |
| 5,063,934 A | | 11/1991 | Rapoport et al. |
| 5,115,836 A | | 5/1992 | Carow et al. |
| 5,211,197 A | | 5/1993 | Marrison et al. |
| 5,529,085 A | | 6/1996 | Richards et al. |
| 5,564,471 A | | 10/1996 | Wilder et al. |
| 5,570,719 A | | 11/1996 | Richards et al. |
| 5,695,221 A | | 12/1997 | Sunderhaus |
| 6,557,824 B1 | | 5/2003 | Jenski, Jr. et al. |
| 7,252,112 B1 | | 8/2007 | Imler et al. |
| 7,487,796 B2 | | 2/2009 | Imler et al. |
| 7,753,079 B2 | | 7/2010 | Nelson |
| 8,342,577 B2 | | 1/2013 | Schoenoff et al. |
| 8,931,499 B2 | | 1/2015 | Clever et al. |
| 9,140,393 B2 | | 9/2015 | Wolff et al. |
| 9,322,498 B2 | | 4/2016 | Wolff et al. |
| 9,528,648 B2 | | 12/2016 | Nanaji |
| 9,708,173 B2 | | 7/2017 | Ballard et al. |
| 9,845,896 B2 | | 12/2017 | Clever |
| 10,054,237 B2 | | 8/2018 | Roth et al. |
| 10,081,532 B2 | | 9/2018 | Gray et al. |
| 11,597,645 B2 | * | 3/2023 | Clever ................ F16L 55/1015 |
| 2012/0241021 A1 | | 9/2012 | Nick |
| 2012/0280586 A1 | | 11/2012 | Englert et al. |
| 2013/0125989 A1 | | 5/2013 | Clever et al. |
| 2014/0311579 A1 | | 10/2014 | Nanaji |
| 2014/0318650 A1 | | 10/2014 | Wolff et al. |
| 2016/0156257 A1 | | 6/2016 | Atkins et al. |

OTHER PUBLICATIONS

European Patent office, partial European Search Report dated Jan. 28, 2022 which pertains to European Patent Application No. 211934351. 15 pages.

OPW Fueling Components Product Catalog, "OPW 66REC ¾" Dry Reconnectable Breakaway" product specification; p. 265 (2009).

OPW Fueling Components Product Catalog, "OPW 66SB Swivel Breakaway" product specification; p. 268 (2009).

OPW Fueling Components Product Catalog, "OPW ln-Line Breakaway (ILB-1)" product specification; p. 397 (2009).

OPW Fueling Components Product Catalog, "OPW 68EZR Series ¾" and 1" Dry Reconnectable Breakaway" product specification; p. 173 (2018).

OPW Fueling Components Product Catalog, "OPW 66CAS Dry Reconnect Inverted Breakaways" product specification; p. 177 (2018).

OPW Fueling Components Product Catalog, "OPW 66V Series Breakaways" product specification; p. 176 (2018).

OPW Fueling Components Product Catalog, "OPW 66ISU Vacuum-Assist Stage II Vapor Recovery Breakaways" product specification; p. 176 (2018).

OPW Fueling Components Product Catalog, "OPW 66CLP Balance Phase II Enhanced Vapor Recovery Reconnectable Breakaways" product specification; p. 179 (2018).

OPW Fueling Components Product Catalog, "OPW 66ISB Vacuum-Assist Stage II Vapor Recovery Reconnectable Swivel/Breakaways" product specification; p. 175 (2018).

OPW Fueling Components Product Catalog, "Fill-Line Breakaway (FLB-1000)—Standard Duty" product specification; p. 17 (2018).

OPW Fueling Components Product Catalog, "CNG Hose Retractor" product specification; p. 24 (2018).

\* cited by examiner

BREAKAWAY ASSEMBLY

This application is a continuation of U.S. patent application Ser. No. 17/005,708 entitled BREAKAWAY ASSEMBLY and filed on Aug. 28, 2020, the entire contents of which are hereby incorporated by reference.

The present invention is directed to a breakaway assembly, and more particularly for a breakaway assembly for use in a fluid dispensing system.

BACKGROUND

Breakaway connectors or assemblies can be utilized in fluid dispensing systems, such as refueling stations and the like. The breakaway assemblies are designed to provide a break in the fluid system which can be closed when a sufficient, predefined separation force is applied thereto. For example, in a drive-away event, the user of a refueling unit may inadvertently leave the nozzle in the tank of a vehicle or automobile and drive away. Breakaway assemblies are designed to provide a breakaway point at which the hose or system can be separated, and also provide a closing valve to prevent or minimize loss of fuel. However, many current breakaway assemblies have various drawbacks.

Single use breakaways typically use shear pins or shear grooves, but such shear elements cannot be fully tested during assembly, which can lead to unpredictable performance. Many existing reconnectable breakaways use using garter springs, canted coil springs, compression springs and deflectable members to provide a releasable connection mechanism. However such releasable connection mechanisms can have relatively high variances in the materials and/or tolerances, and thus lead to unpredictable separation force.

Existing breakaways can also have issues accommodating pressure pulses in the dispensed fluid. Since single use breakaways use a rigid member that is designed to shear or break when sufficient force is applied, and such components can undesirably separate when a sufficiently powerful pressure pulse is transmitted. Reconnectable breakaways can also be prone to separation due to force or pressure spikes and/or internal components can be damaged due to the force or pressure spike.

Finally, existing breakaways typically have valves that are designed to close after a breakaway event. However, the valves may not close in a sufficiently predictable manner.

SUMMARY

In one embodiment, the present invention is a breakaway assembly that is reconnectable, provides a relatively consistent separation force, in one case using magnets, in one case which can accommodate force or pressure spikes, and in one case provides an improved closure valve arrangement. More particularly, in one embodiment, the invention is a breakaway assembly including a first connector and a second connector releasably coupleable to the first connector, wherein the assembly is movable between a first configuration in which the first and second connectors are releasably coupled and together define a fluid path through which fluid is flowable, wherein the fluid path includes an at least partially radially extending portion, and a second configuration in which the first and second connectors are not coupled together. The assembly is configured to move from the first configuration to the second configuration when a predetermined separation force is applied to the assembly. One of the first or second connectors has a shaft which defines or includes at least part of the fluid path therein, and the at least partially radially extending portion includes or is defined by an opening in the shaft. The assembly further includes a closure valve positioned in the one of the first or second connectors. The closure valve is configured to be in an open position when the assembly is in the first configuration to allow fluid to flow therethrough, and to move to a closed position blocking the at least partially radially extending portion of the fluid path when the assembly moves to the second configuration to generally block a flow of fluid therethrough. The closure valve includes a slider that is configured to sealingly engage the shaft to seal the fluid path when the assembly is in the closed position. The assembly is configured to be pressure balanced when the assembly is in the second configuration such that internal pressure-induced force is balanced when the assembly is in the second configuration and pressurized fluid is positioned in the fluid path.

BRIEF DESCRIPTION OF DRAWINGS

FIG. 1A is a detail view of the area indicated in FIG. 1;

DETAILED DESCRIPTION

System Overview

Figure 1:
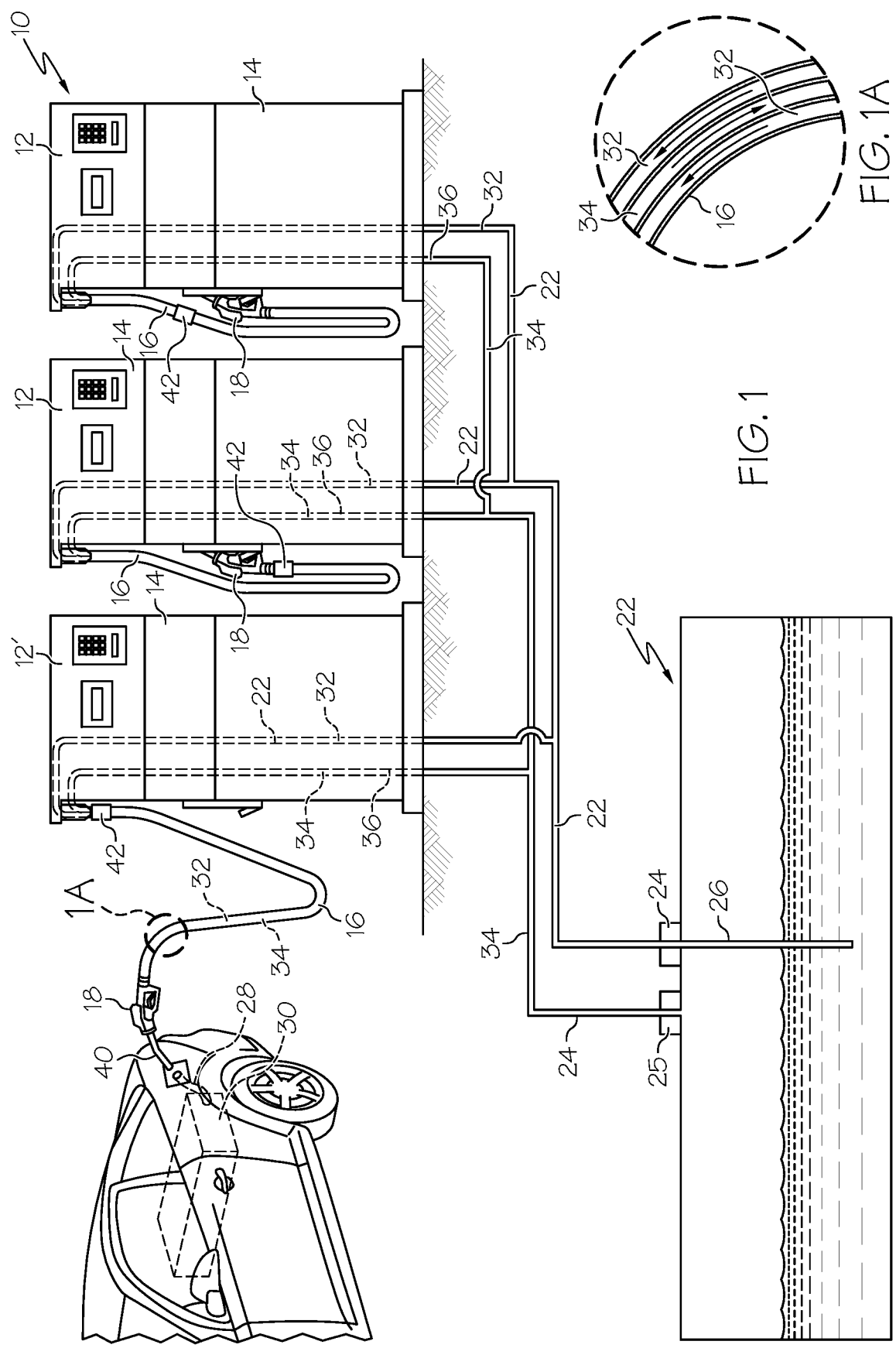
FIG. 1 is a schematic representation of a refueling system utilizing a breakaway assembly.

FIG. 1 is a schematic representation of a refilling system 10 including a plurality of dispensers 12. Each dispenser 12 includes a dispenser body 14, a hose 16 coupled to the dispenser body 14, and a nozzle 18 positioned at the distal end of the hose 16. Each hose 16 may be generally flexible and pliable to allow the hose 16 and nozzle 18 to be positioned in a convenient refilling position as desired by the user/operator.

Each dispenser 12 is in fluid communication with a fuel/fluid storage tank 20 via a liquid or fluid conduit or path 22 that extends from each dispenser 12 to the storage tank 20. The storage tank 20 includes or is fluidly coupled to a fuel pump 24 which is configured to draw fluid/fuel out of the storage tank 20 via a pipe 26. During refilling, as shown by the in-use dispenser 12' of FIG. 1, the nozzle 18 is inserted into a fill pipe 28 of a vehicle fuel tank 30. The fuel pump 24 is then activated to pump fuel from the storage tank 20 to the fluid conduit 22, hose 16 and nozzle 18 and into the vehicle fuel tank 30 via a fuel or fluid path or fluid conduit 32 of the system 10.

In some cases, the system 10 may also include a vapor path 34 extending from the nozzle 18, through the hose 16 and a vapor conduit 36 to the ullage space of the tank 20. For example, as shown in FIG. 1A, in one embodiment the vapor path 34 of the hose 16 is received in, and generally coaxial with, an outer fluid path 32 of the hose 16. The nozzle 18 may include a flexible vapor boot or bellows, sleeve or the like (not shown) of the type well known in the art which is coupled to, and circumferentially extends around, a spout 40 of the nozzle 18.

The bellows is designed to form a seal about the spout 40 when the spout 40 is inserted into the fill pipe 28. The bellows help to capture vapors and route the vapors into the vapor path 34, although vapors can also be captured with nozzles 18 lacking a bellows. The system 10 may include a vapor recovery pump 25 which applies a suction force to the vapor path 34 to aid in vapor recovery, although in some cases (e.g. so-called "balance" systems) the vapor recovery pump 25 may be omitted. In addition, in some cases the system 10 may lack the vapor path 34, in which case the system 10 may lack the vapor conduit 36, and the hose 16 may lack the vapor path 34 therein.

The system 10 disclosed herein can be utilized to store/dispense any of a wide variety of fluids, liquids or fuels, including but not limited to petroleum-based fuels, such as gasoline, diesel, natural gas (including compressed natural gas (CNG)), biofuels, blended fuels, propane or liquefied petroleum gas (LPG), oil or the like, or other fuels or liquids such as hydrogen, ethanol the like, Each dispenser 12 may include a breakaway assembly 42 associated therewith, which can be located at various positions on the dispenser 12, or along the system 10. For example, the left-most dispenser 12' of FIG. 1 utilizes a breakaway assembly 42 at the base end of the hose 16; the middle dispenser 12 of FIG. 1 utilizes a breakaway assembly 42 positioned adjacent to the nozzle 18; and the right-most dispenser 12 of FIG. 1 utilizes a breakaway assembly or assembly 42 at an intermediate position of the hose 16. However, it should be understood that the breakaway assembly 42 can be positioned at any of a wide variety of positions along the length of the hose 16, or at other positions in the refueling system 10. The breakaway assembly 42 may include, and/or be coupled to, a swivel assembly to enable the breakaway assembly 42 to assume various positions and become aligned with any separation forces applied thereto.

Breakaway Overview

Figure 2:
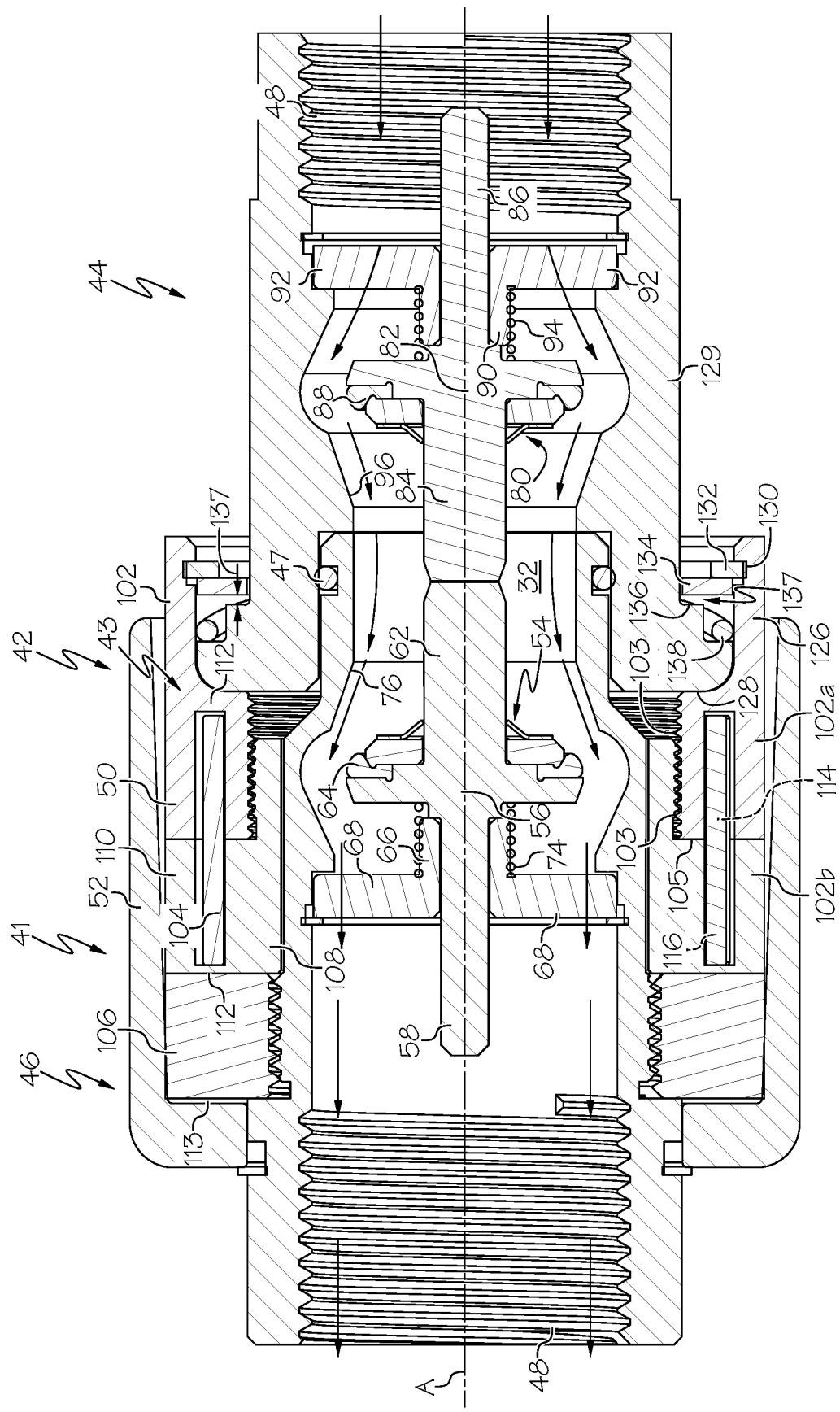
FIG. 2 is a side cross sectional view of one embodiment of a breakaway assembly, shown in its connected configuration.
Figure 3:
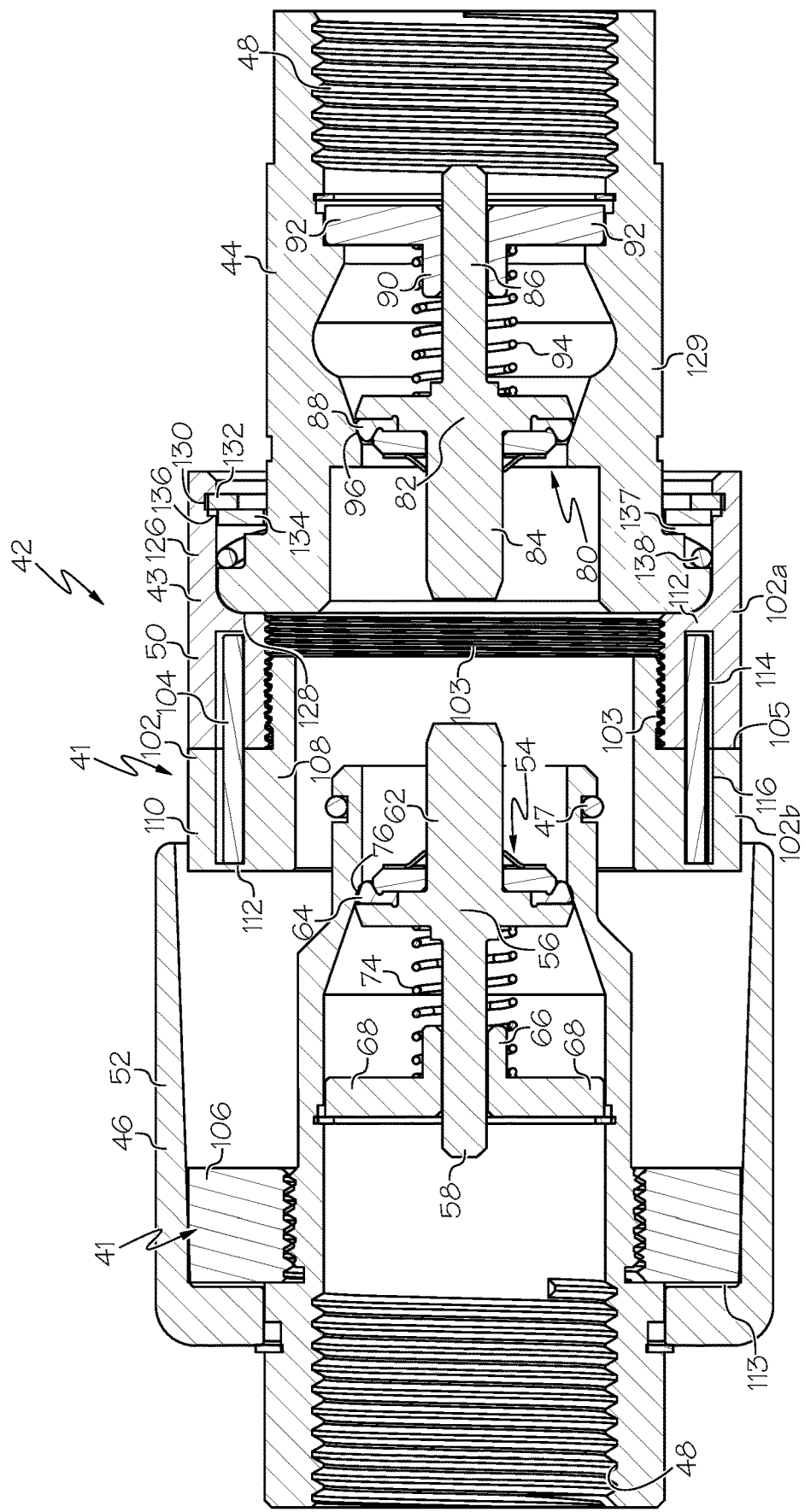
FIG. 3 is a side cross sectional view of the breakaway assembly of FIG. 2, shown in its disconnected configuration.

FIGS. 2 and 3 illustrate one embodiment of the breakaway assembly 42, for use with conventional (typically liquid) fuels such as gasoline, diesel, oil or the like that are pumped under relatively low pressure, such as less than about 50 psi in one case, or less than about 100 psi in another case, or less than about 150 psi in another case, or less than about 300 psi in yet another case. The breakaway assembly 42 includes a first or upstream connector 44 releasably connected to a second or downstream connector 46. The breakaway assembly 42 and connectors 44, 46, are generally annular in one case, with the fluid path 32 positioned therein, but can have other shapes as desired. The first connector 44 may be connected to an upstream portion of the system 10/hose 16, and the second connector 46 may be connected to a downstream portion of the system 10/hose 16 (it should be understood that terms used in relation to the direction of flow, such as "upstream" and "downstream," are used herein with respect to the direction of the flow of fluids/fuel to be dispersed (i.e. right-to-left in FIGS. 2, 3, 13 and 14, and left-to-right in FIGS. 17-19, as opposed to for example the direction of vapor flow, unless specified otherwise). However, if desired this orientation may be reversed such that first connector 44 is connected to a downstream component, and the second connector 46 is connected to an upstream component. Both the first connector 44 and second connector 46 can include threaded surfaces (such as the illustrated internal threaded surfaces or threaded adapters 48) for securing the connectors 44, 46 to the associated upstream and downstream components. The threaded surfaces 48 could instead take the form of externally threaded surfaces, or various other coupling structures besides threaded surfaces may be used.

The first connector 44 may include a generally tubular or annular coupling portion 50, which can have a variety of shapes in cross section, and which can be removably receivable in a socket or protective cover 52 of the second connector 46. The second connector 46 further includes a closure valve or poppet valve 54 positioned therein. The poppet valve 54 includes a body portion 56 having a downstream stem 58, an upstream stem 62, and seal or sealing portion 64 coupled to the body portion 56. The downstream stem 58 is slidably received in a guide 66 which is positioned or centered in the second connector 46 by a plurality of radially-extending fins 68. The poppet valve 54 further includes a spring 74 positioned axially between the guide 66 and the body portion 56. The body portion 56/poppet valve 54 is thereby biased, by the spring 74, to an upstream/closed position in which the sealing portion 64 sealingly engages the poppet valve seat 76 (see FIG. 3). The second connector 46 may include a seal 47 on a radially outer surface of its axially-forwardly extending end to help form a seal with the inner surface of the first connector 44.

The first connector 44 may include a closure valve or poppet valve 80 positioned therein. The poppet valve 80 includes a body portion 82 having a downstream stem 84, an upstream stem 86, and seal or sealing portion 88 coupled to the body portion 82. The upstream stem 86 is slidably received in a guide 90 which is positioned/centered in the first connector 44 by a plurality of radially-extending fins 92. The poppet valve 80 further includes a spring 94 positioned between the guide 90 and the body portion 82. The body portion 82/poppet valve 80 is thereby biased, by the spring 94, to a downstream/closed position in which the sealing portion 88 sealingly engages the poppet valve seat 96 (see FIG. 3).

During normal operation of a dispenser 12, the first connector 44 and second connector 46 are arranged in their first/locked/connected/engaged state or configuration, as shown in FIG. 2, in which the first 44 and second 46 connectors are coupled together and define an open fluid conduit, or fluid path 32 through which fluid may flow, as shown by the arrows of FIG. 2. In this configuration, the upstream stem 62 of the poppet valve 54 engages and moves the downstream stem 84 of poppet valve 80 away from its valve seat 96, and vice versa, such that the springs 74, 94 of both poppet valves 54, 80 are compressed and both poppet valves 54, 80 are opened. When the poppet valves 54, 80 are opened the seals 64, 88 are spaced away from their associated seats 76, 96, enabling fluid to flow through the fluid path 32/breakaway assembly 42/connectors 44, 46. As will be described in greater detail below, a coupling mechanism or coupling system 41 is provided to releasably couple the connectors 44, 46 in the axial direction.

When sufficient separation forces are applied to the assembly 42 (i.e. forces applied at least partially along the axis of the breakaway assembly 42/connectors 44, 46), the coupling mechanism 41 releases/separates and the breakaway assembly 42 moves to its second/separated/disconnected state or configuration as shown in FIG. 3. When the connectors 44, 46 are moved away from each other, the downstream stem 84 of the poppet valve 80 is pulled away from the upstream stem 62 of poppet valve 54. The relative movement of the connector(s) 44, 46 away from each other enables the poppet valves 54, 80 to move to their closed positions, as shown in FIG. 3 in which the seals 64, 88 engage their associated valve seats 76, 96, as biased by their associated springs 74, 94.

The assembly 42 may be reusable and may be configured such that the connectors 44, 46 are connectable/reconnectable (i.e. movable from the configuration of FIG. 3 to that of FIG. 2) without requiring any repair or replacement of any components of the assembly 42. In particular, when the first connector 44 and second connector 46 are connected/reconnected, the downstream stem 84 of the poppet valve 80 engages the upstream stem 62 of the poppet valve 54. When sufficient axial compression forces are applied to the assembly 42 during the reconnection process, the body portions 56, 82 of the poppet valves 54, 80 and associated seals 64, 88 are moved away from their respective valve seats 76, 96 until the valves 54, 80 are in the position shown in FIG. 2.

The illustrated embodiment shows both the first 44 and second 46 connectors having poppet valves 54, 80 therein. However, in an alternate embodiment, only one of the connectors 44, 46 has a poppet valve. In this case, the other connector 44, 46, lacking a poppet valve, may include a rigid, axially-extending hold-open stand, analogous to the portions 62/84, which extends axially forwardly and can engage the poppet valve (e.g. valve 54, 80) in the other connector 44, 46 and urge the other poppet valve to the open position when the assembly 42 is in its connected configuration. In yet another alternate embodiment, when the assembly 42 is used with dispensing systems utilizing vapor recovery systems, one or both of the connectors 44, 46 may include poppet valves in or at least partially defining the vapor path 34 which are opened when the assembly 42 is in the connected configuration, and which automatically close when the assembly 42 moves to the disconnected position. Examples of these arrangements are disclosed in U.S. Pat. No. 8,931,499, the entire contents of which are hereby incorporated by reference herein.

Magnetic Coupling/Breakaway

The assembly 42 may include the coupling mechanism 41 which releasably couples the connectors 44, 46 together to retain the assembly 42 in its coupled position until sufficient axial forces are applied. The coupling mechanism 41 may include a magnet unit 43, which includes a magnet coupler 102 that receives various magnets 104 therein. The magnet unit 43 is coupled to the first connector 44 in the illustrated embodiment. The coupling mechanism 41 can also include an attraction member 106 (or other member which completes the magnetic circuit) which can be made of a ferrous material or other material that is magnetically attracted or attractable to the magnets 104/magnet unit 43. The attraction member 106 is coupled to the second connector 46 in the illustrated embodiment. In the particular illustrated embodiment the magnet unit 43 constitutes or defines the coupling portion 50 of the first connector 44 that is received in the socket/cover 52 of the second connector 46. If desired, the positioning of the magnet unit 43 and attraction member 106 can be reversed from that shown such that the attraction member 106 is coupled to the first connector 44, and the magnet unit 43 is coupled to the second connector 46.

In one embodiment the attraction member 106 is generally annular and made of a ferrous material or other magnetizable material, and directly threadably attached to the body of the first connector 44. The attraction member 106 could instead be made of or include a magnet or magnets configured and arranged to be magnetically attracted to an associated magnet(s) 104 of the magnet unit 43 when properly aligned. Further alternately, rather than being a continuous annular member, the attraction member 106 can instead take the form of various, discrete and spaced apart attraction member units or portions positioned to magnetically interact with the magnet unit 43.

The magnets 104 of the magnet unit 43 can be made of any of a wide variety of materials, including permanently magnetized materials such as rare earth magnets, including neodymium in one case. The magnet coupler 102 and/or attraction member 106 can be made of a magnetized and/or magnetizable material such as ferromagnetic material or metal (iron, cobalt, nickel, manganese, gadolinium, dysprosium or others), paramagnetic materials, diamagnetic materials, ferrimagnet metals, ferromagnetic alloys, sheet steel or cast steel, or in some cases non-magnetized or non-magnetizable material, each of which can if desired be covered with a ferromagnetic coating or plating, such as nickel in one case but could be nearly any ferromagnetic metal or alloy which will not unduly interfere with any potentially desired magnetic field. The magnets 104 and/or magnet coupler 102 and/or attraction member 106 can be plated, coated, encapsulated or unplated.

In one case the magnet coupler 102 and/or attraction member 106 can have, or be made of a material having, a saturation point that is greater than about 1.25 Tesla to provide the desired ferromagnetic response. In particular, it may be desired to have the magnet coupler 102, as energized/magnetized by the magnets 104 received therein, magnetically interact with the attraction member 106 as a unit, rather than have the individual magnets 104 directly magnetically interact with the attraction member 106. The magnet coupler 102 can thus be configured, sized and shaped to direct the magnet field in a desired and advantageous manner. In particular, by passing the induced magnetic field through the magnet coupler 102, the magnetic field lines originating with the magnets 104 tend to pass through the radially inner 108 and radially outer 110 annular components or surfaces of the magnet coupler 102 (and not, for example, through the web or end wall 112 at the base of the magnet coupler 102), which provides a stronger magnetic force since the web 112 acts as a shunting member. Moreover, since the web 112 acts as a shunting member it may be desired to avoid or minimize the magnetic field lines passing through the web 112, and thus may be desired to keep the web 112 as thin as possible.

The web 112 may have a thickness (e.g. in the axial direction) that allows the greatest amount of magnetic flux field to pass into/through the magnet coupler 102, which is dependent on a balance of factors, including the strength of the magnetic field, and the permeability and saturation limits of the materials of the magnet coupler 102. The ratio of the thickness of the web 112, to the field penetration depth, may between about 5% and about 15% in one case, where the field penetration depth is dependent on the saturation point of the material of the magnet coupler 102. In a case where the magnetic flux density is between 1.25 T and 2 T, the field penetration depth can be between 0.25" and 0.625", and the thickness of the web 112 can range from 0.0125" to 0.09375". In one case the web 112 has an axial length of less than about 25% in one case, or less than 10% in another case, or less than 5% in another case, or less than 2.5% in another case of a length of the magnets 104 and/or length of the magnet unit 43. In some cases it may be desired to eliminate the web 112 entirely for magnetic performance, but doing so could create difficulties in physically retaining the magnets 104 in the desired axial position in the magnet coupler 102. In some cases the web 112 can be slotted or have other openings to reduce the shunting effect of the web 112.

The attraction member 106 and magnet unit 43 can thus form the coupling mechanism 41 that releasably couples the connectors 44, 46 together and tends to retain the assembly 42 in its first/locked/connected/engaged state or configuration, as shown in FIG. 2. The coupling mechanism 41 may thus solely or primarily determine the separation force of the breakaway assembly 42.

When an external axial force is applied to the breakaway assembly 42 that is greater than the attractive force of the magnet unit 43 to the attraction member 106, a separation will occur in the following sequence. The downstream connector 46 will first move away from the upstream connector 44, along with nearly all associated portions of the downstream connector 46 (e.g. except for the associated poppet valve 54 which may begin to close). Both poppet valves 54, 80 may simultaneously start move to their closed position. In one case, after roughly ¼" of travel of the connectors 44, 46 away from each other, both poppet valves 54, 80 will be fully moved to their closed positioned. As the separation motion continues, at a greater distance, about 5/16" of travel in one case, the upstream connector 44 will be fully extracted out of the socket 52 of the downstream connector 46 (shown as nearly fully extracted in FIG. 3). In this state the connectors 44, 46 are separated and the poppet valves 80, 54 are closed to prevent or limit the leakage of fluid.

After the connectors 44, 46 are separated, it may then be desired to reconnect the connectors 44, 46. In one case the connectors 44, 46, can be axially aligned and manually pressed together such that the magnet unit 43 fits into the socket 52. The connectors 44, 46 are then pressed together, and the springs 94, 74 compressed until the poppet valves 80, 54 are open as shown in FIG. 2. During a reconnection event, since the attraction member 106 is positioned on or in the downstream connector 46, the magnet unit 43 will be at some point during insertion be sufficiently attracted to the attraction member 106 such that the magnet unit 43/assembly 42 may be felt to "snap" into place. In addition, the attraction between the magnet unit 43 and the attraction member 106 may reduce the reconnection force and act as a magnetic assist feature, aiding a user in reconnection. Thus the (manual) force required to connect the first 44 and second 46 connectors can be less than the force required to separate the first 44 and second 46 connectors in a breakaway event, which can provide an easier and more convenient reconnection process.

Magnet Coupler Configuration

In the embodiment shown in FIGS. 2-6, the magnet coupler 102 has an upstream portion 102a with an annular channel or channel portion 114 formed therein, that is removably attachable to a downstream portion 102b with a correspondingly shaped and located channel or channel portion 116. Each portion 102a, 102b can have a web or end wall 112 positioned at an axial end of the portion 102a, 102b and positioned adjacent to the associated channel 114, 116. The upstream 102a and downstream 102b portions can be separate components or parts that are coupled together at or along a joint 105 that is aligned in a radial plane. One or both channel portions 114, 116 can receive the magnets 104 therein. Each magnet coupler portions 102a, 102b can include a threaded surface 103 thereon, where the threaded surfaces 103 are configured to threadably engage each other to form the generally closed magnet coupler 102 shown in FIG. 4 (when assembled) and FIG. 5. When the magnet unit 43 is fully assembled by joining the upstream 102a and downstream 102b portions by mechanical, releasable or other means an internal, closed channel 114, 116 is formed therein that receives and encapsulates the magnets 104 therein.

Figure 4:
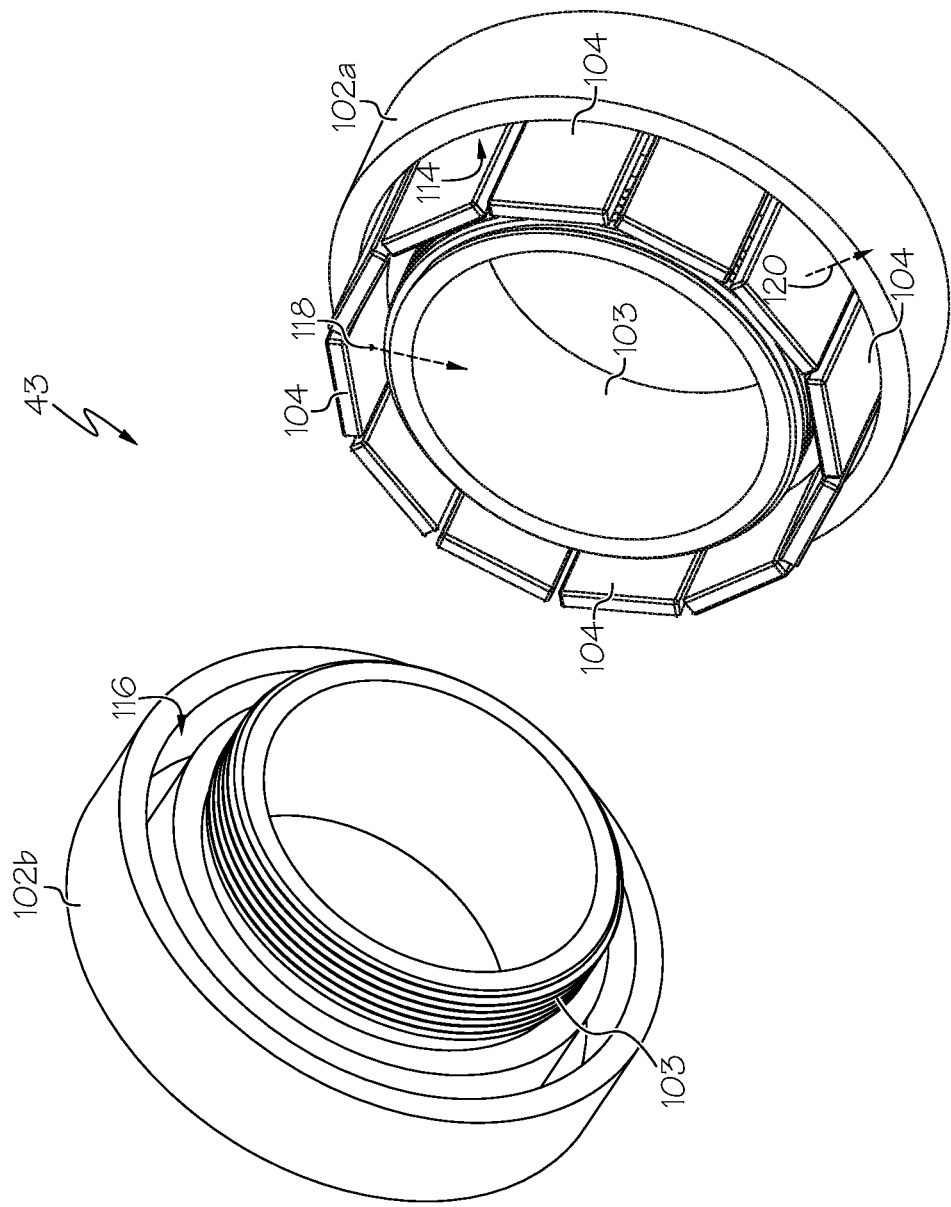
FIG. 4 is front perspective view of the magnet unit of the breakaway assembly of FIG. 2, shown partially disassembled.
Figure 5:
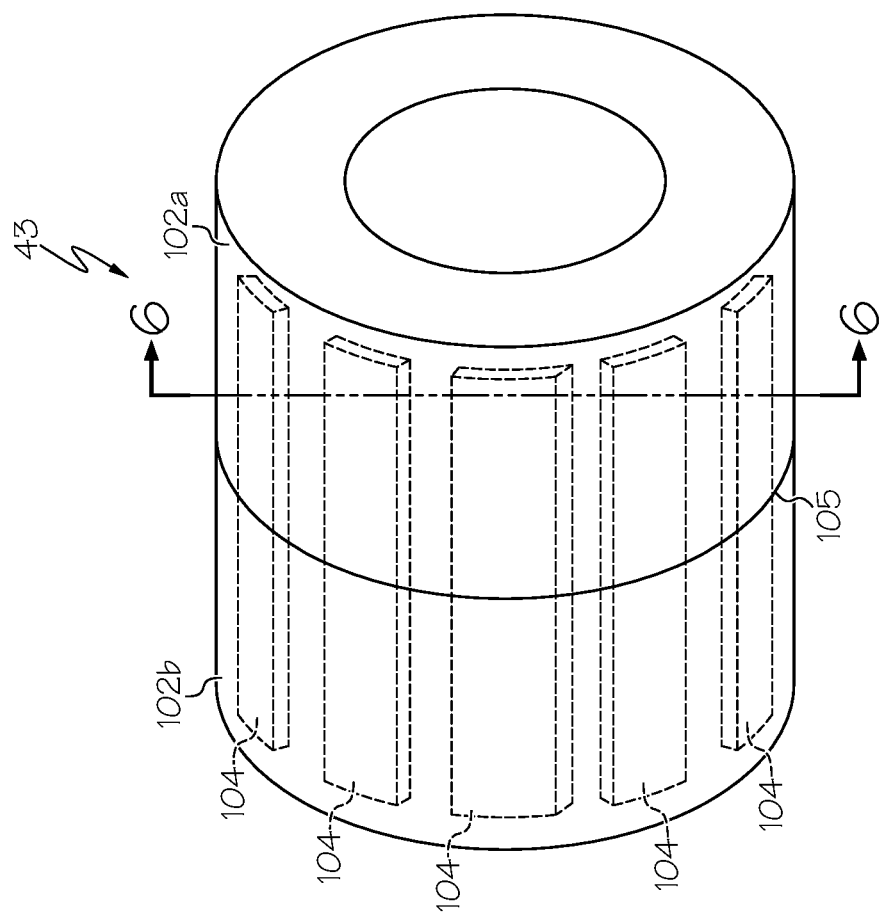
FIG. 5 is a front perspective view of the magnet unit of FIG. 4, shown in an assembled condition.

In the illustrated embodiment and with reference to FIG. 4, in one case each magnet 104 is shaped as a rectangular prism and the poles 118, 120 of the magnets 104 are oriented perpendicular to the largest face of the magnet 104. In one case the magnets 104 are arranged with their north poles 118 positioned on (extending perpendicular to) the radially inner faces of the magnets 104, and their south poles 120 positioned on (extending perpendicular to) the radially outer faces of the magnets 104. Thus the poles 118, 120 of the magnets 104 can be oriented perpendicular to the central axis A (FIG. 2) of the assembly 42, or non-parallel with axis A, and aligned with a radial line pointing radially inwardly or outwardly.

Figure 6:
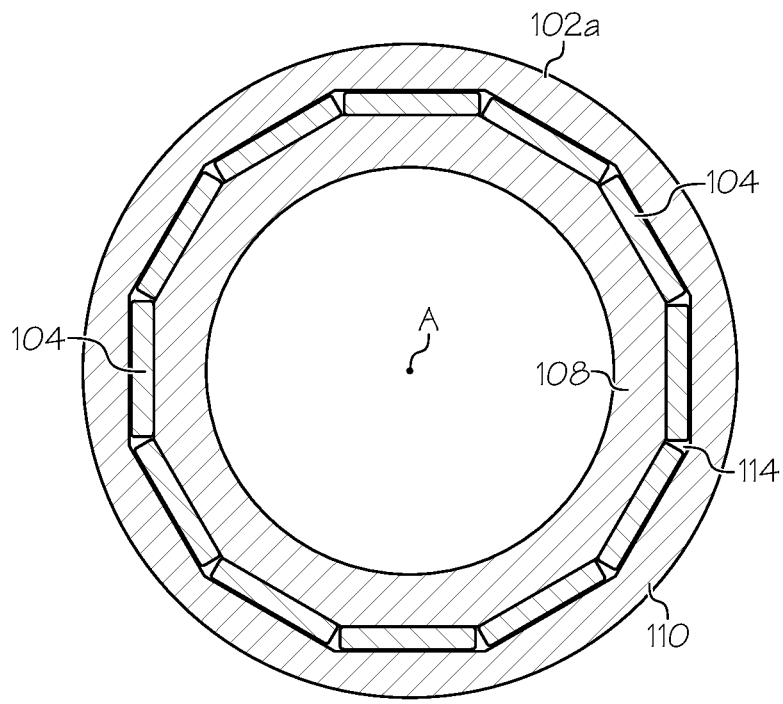
FIG. 6 is a cross section taken along line 6-6 of FIG. 5.

As shown in FIG. 6, in one case the channel 114 of the upstream portion 102a can be formed in end view as a prism with a number of sides (twelve sides in the illustrated embodiment) that corresponds to the number of magnets 104, where the number of sides of the channel 114 can be adjusted to match the number of magnets 104 to be used. It is noted that while FIG. 6 illustrates the channel 114 formed in portion 102a, the channel 116 in the portion 102b can have the same shape and positioning. It is also noted that when the channels 114, 116 are not circular, the magnet coupler portions 102a, 102b may be connected together by means other than threaded surfaces 103, such as by using press fit, rabbiting, retaining rings or the like. The polygon shape for the channels 114, 116 can help to reduce any air gap between the poles/largest face of the magnets 104 and the magnet coupler 102, thereby increasing magnetic performance. In addition, this configuration enables the use of magnets 104 that are rectangular prisms, as compared to for example curved magnets, which can be more expensive and difficult to manufacture.

Figure 7:
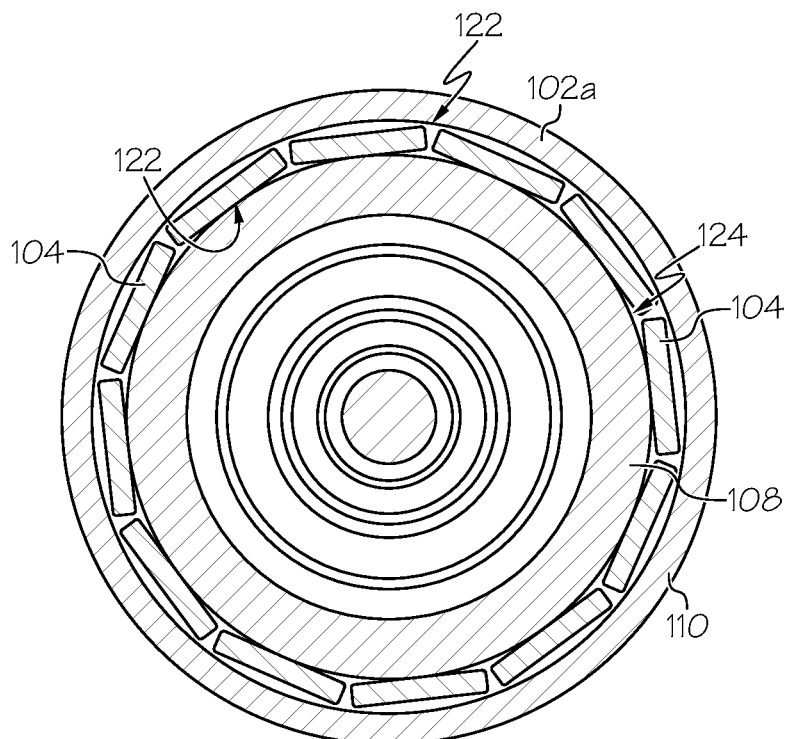
FIG. 7 is a cross section of an alternate configuration of the magnet unit of FIG. 4.

The polygon of the channels 114, 116 can be regular or irregular, and in one case has at least four sides. However, the polygon-shaped channel 114, 116 can in some cases be difficult to machine. Thus, if desired channels 114, 116 having a circular shape, which is easier to machine, can be used as shown in FIG. 7, and used in conjunction with rectangular prism magnets 104. In this case the magnets 104 can be positioned tangent to the channel 114, 116. Moreover, in this case the magnets 104 and/or channel 114, 116 can also be configured such that each magnet 104 has three points of contact (or potential contact) with the channel 114, 116: the center portions of each magnet 104 may be in contact or near contact with the radially-inner wall of the channel 114, 116, and the circumferentially outer portions of each magnet 104 may be in contact or near contact with the radially-outer wall of the channel 114, 116. The three points of contact (or near contact) helps to securely locate each magnet 104 in the channel 114, 116.

In order to position the magnets 104 in the channel 114, 116 it may not be practical to provide three points of actual contact due to lack of sufficiently precise manufacturing and lack of sufficient tolerances. In this case there may be a relatively small radially-extending outer gap 122 between the circumferentially outer portions of the magnets 104 and the radially-outer wall of the channel 114, 116, and/or between the inner/central surface of the magnets 104 and the radially-inner wall of the channel 114, 116. The gap(s) 122 for a given magnet 104 may have a total cumulative length (in the radial direction) of less than about 0.1" in one case, or less than about 0.05" in one case, or less than about 0.03" in another case, or less than about 1% of the length of the magnet 104 (in a generally circumferential direction). The gap(s) 122 may also be less than about 5% in one case, or less than about 1% in another case, relative to a radius of an outer surface of the portion 102a/102b.

Each magnet 104 may also define a somewhat triangular-shaped gap 124 positioned between the circumferentially-outer portions of adjacent magnets 104 and the radially inner surface of the channel 114, 116. The inner gap 124 can be reduced as more magnets 104 are used. The gap(s) 124 for a given magnet 104 can each, or cumulatively, have a length in the radial direction that corresponds to the parameters of the gap 122 outlined above.

Figure 14:
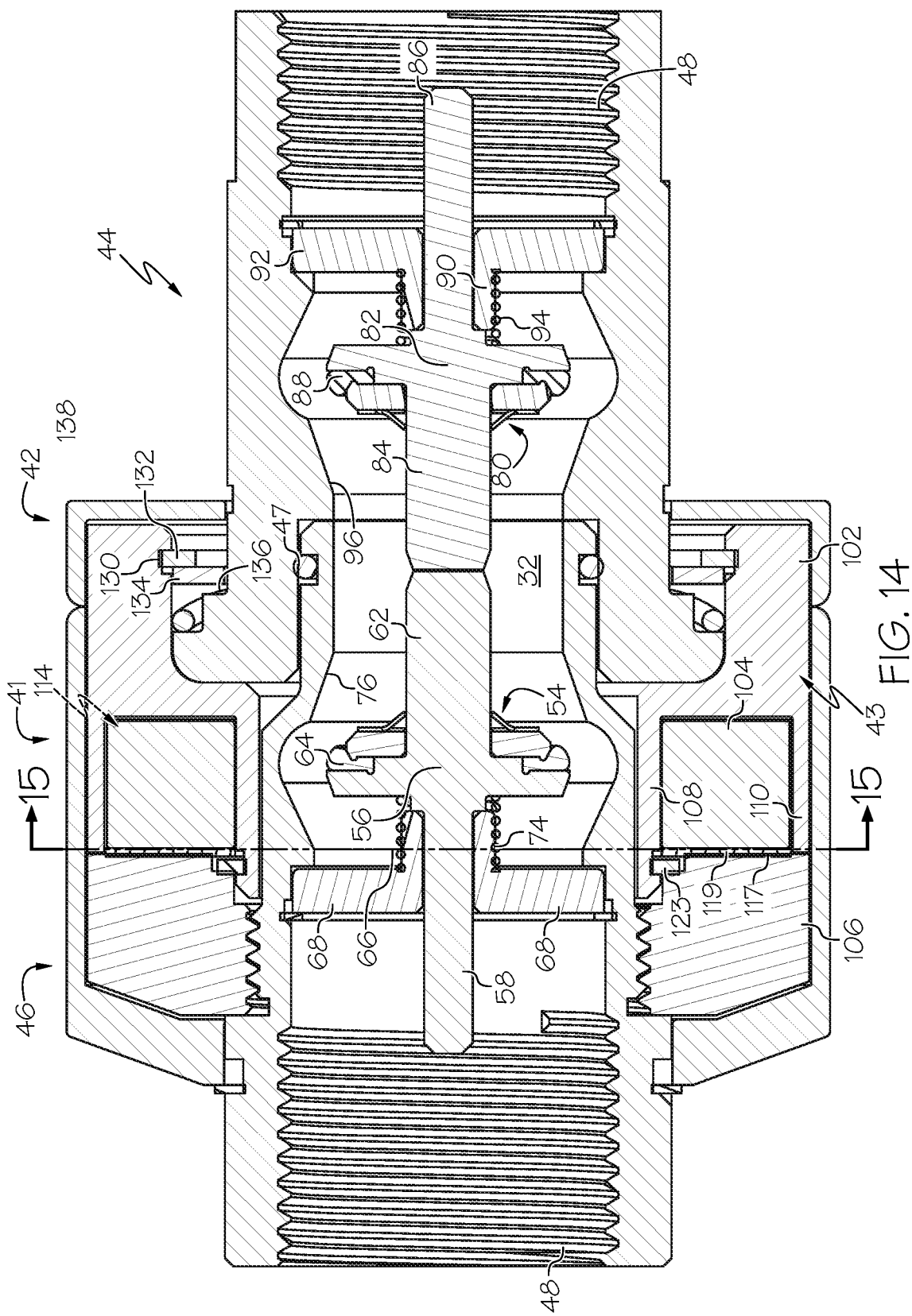
FIG. 14 is a side cross sectional view of another breakaway assembly.
Figure 15:
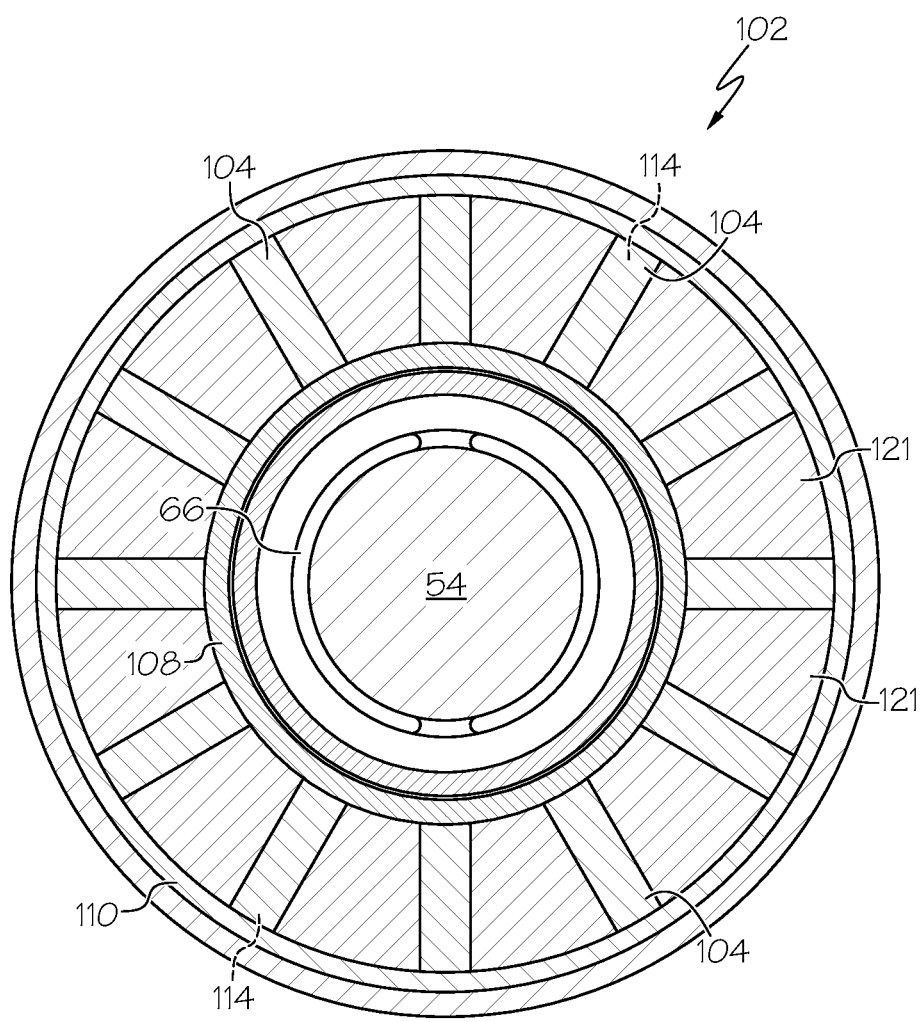
FIG. 15 is a cross-sectional view of the magnet unit of the breakaway assembly of FIG. 14, taken along line 15-15.
Figure 15A:
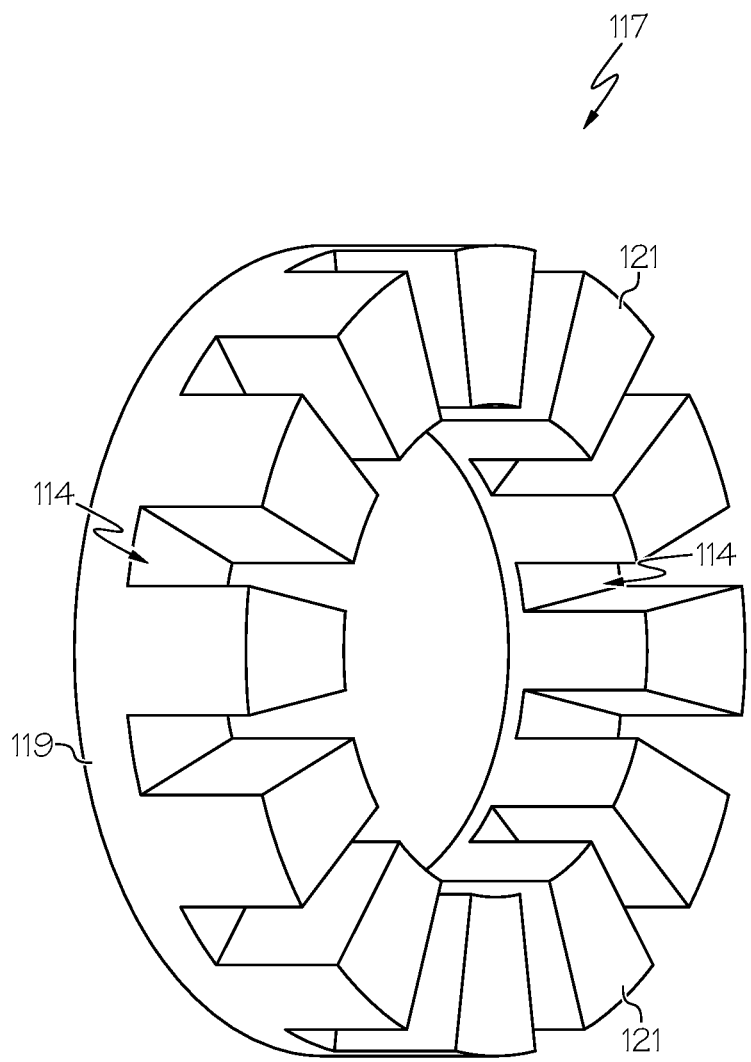
FIG. 15A is a side perspective view of a magnet retainer of the magnet unit of FIG. 15.

The magnets 104 can also be positioned in various different arrangements such as that shown in FIG. 8 wherein the magnets 104, in end view, are positioned in discrete, spaced apart, generally radially aligned closed channels, in the same or similar manner as shown in the embodiment of FIGS. 14, 15 and 15A and described in greater detail below. Alternatively, as shown in FIGS. 9-11 the magnets 104 can be positioned in channels 114, 116 that form various angles (defined by the angle between: a) a radially outwardly extending line aligned with the channel 114, 116 and b) a radial line, as shown by the labelled angles in FIGS. 9-11). Thus the plane defined by the largest faces of the magnets 104 can be oriented perpendicular to a radial line (FIGS. 6 and 7, wherein the poles are aligned with a radial line), or parallel to radial line (FIG. 8, wherein the poles are oriented perpendicular to a radial line) or positioned at various angles relative to a radial line (FIGS. 9-11).

Since each magnet 104 can be formed as a rectangular prism, each magnet 104 may have a longest dimension (a length, in one case), that extends or is oriented or aligned axially in the disclosed embodiment. Each magnet 104 may have a second-longest dimension (a width, in one case) that extends or is oriented or aligned radially (e.g. extends along a radial line) as in the embodiment of FIG. 8; or that extends or is oriented or aligned generally circumferentially as in the embodiments of FIGS. 6 and 7. Each magnet 104 may have a third-longest dimension (thickness) that extends or is oriented or aligned radially (e.g. extends along a radial line) as in the embodiment of FIGS. 6 and 7. In this configuration the magnets 104 can also be considered to be circumferentially aligned.

In the embodiment of FIG. 11 the face of the magnets 104 with the north poles 118 can be arranged to face radially inward, toward the central axis A of the assembly 42, which controls how the magnetic circuit is completed by forcing the magnetic field through the attraction member 106. This arrangement of inwardly-facing north poles 118 may be utilized when the magnets 104 are at an angle, relative to a radial line (on the radially outer side of the magnet 104 in one case), of equal to or greater than 45 degrees as shown in FIG. 11, and also FIGS. 6 and 7.

In arrangements when the magnets 104 are arranged at angles equal to or less than 45 degrees (e.g. FIGS. 8-10) the polarity of the magnets 104, or the inwardly-facing surfaces of the magnets 104, can alternate between the north poles 118 and south poles 120. In these cases the poles 118, 120 of the magnets 104 can alternate such that a north pole 118 of each magnet 104 faces the north pole 118 of an adjacent magnet 104. In addition, in these configurations an (exactly) even number of magnets 104 may be utilized to ensure the alternating pattern is maintained about the entire circumference of the magnet unit 43. This alternating arrangement of magnets 104 (e.g. when arranged at angles of equal to or less than 45 degrees) maximizes the magnetic flux field to generate the highest level of available magnetic attractive force by physically isolating the opposite poles 118, 120 of adjacent magnets 104 to avoid a magnetic short-circuit between adjacent magnets 104.

Figure 8:
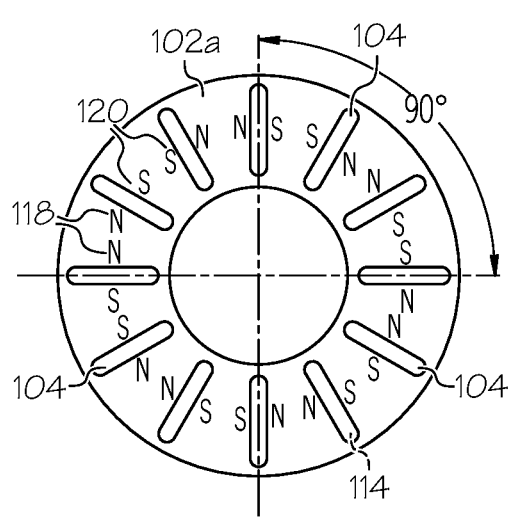
FIG. 8 is a cross section of an alternate configuration of the magnet unit of FIG. 4.
Figure 9:
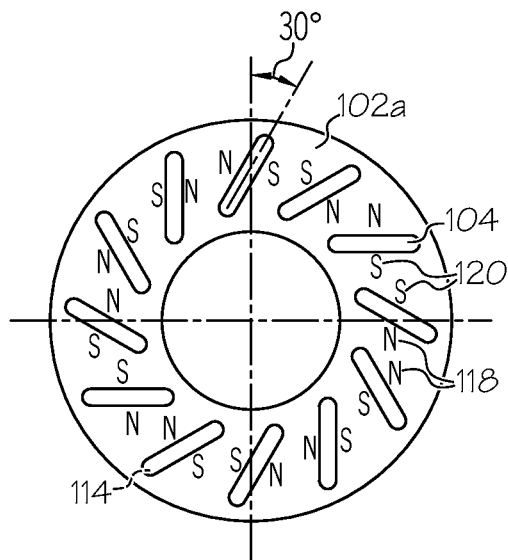
FIG. 9 is a cross section of an alternate configuration of the magnet unit of FIG. 4.
Figure 10:
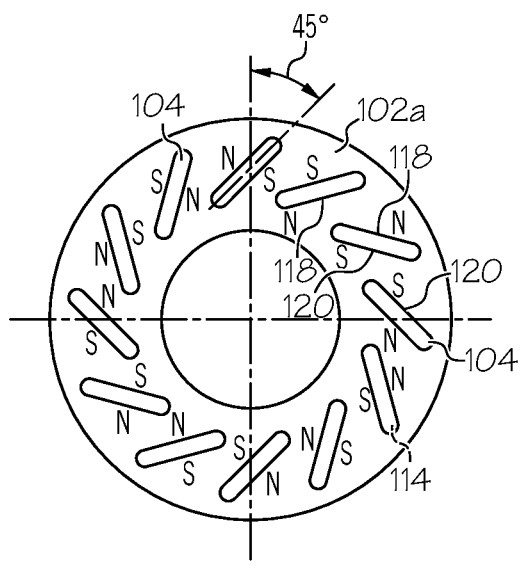
FIG. 10 is a cross section of an alternate configuration of the magnet unit of FIG. 4.
Figure 11:
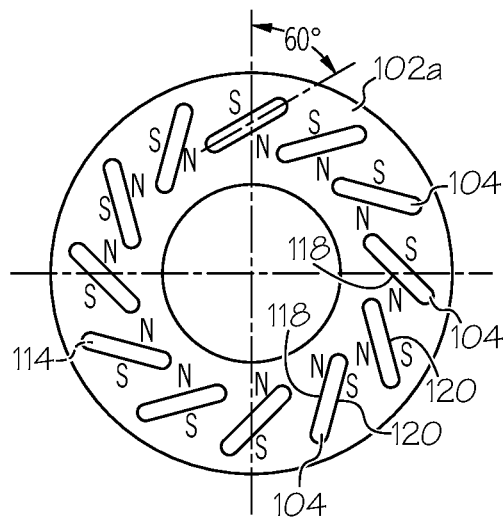
FIG. 11 is a cross section of an alternate configuration of the magnet unit of FIG. 4.

The arrangement shown in FIGS. 8-10 (e.g. magnets 104 arranged at angles of equal to or less than 45 degrees) can also reduce the adverse effects from the repulsive forces between adjacent magnets 104. Such a repulsive force will occur when the magnetic field is flowing from north 118 to south poles 120 on a magnet 104, and the magnetic field from an adjacent magnet 104 is flowing in the same direction. These magnetic interactions can thereby be accommodated by the alternating pole arrangement to avoid a reduction in the net magnetic attractive force, which as noted above defines or primarily determines the separation force between the magnet unit 43 and the attraction member 106.

If the magnets 104 are arranged at angles of equal to greater than about 45 degrees (for example FIGS. 6 and 7 (90 degrees) and FIG. 11 (60 degrees)), the number of magnets 104 can be even or odd, and the magnetic poles 118, 120 may not need to be alternated due to dissipated magnetic forces. In the embodiment of FIG. 11 the strength of the magnets 104 may need to be relatively low since the adjacent magnets 104 may be more prone to a "short circuit" since the north poles 118 are not as physically isolated from the south poles 120 of an adjacent magnet 104. In addition, the adjacent magnets 104 may experience greater repulsive forces since the poles 118/120 on one magnet 104 are not as physically isolated from the poles 118/120 on an adjacent magnet 104. Thus in one case the magnets 104 are positioned at an angle other than perpendicular relative to a radial line in axial end view. However, in some cases the embodiment of FIG. 11, or other similar arrangements which do not provide optimized magnetic performance, may be desired when the magnetic force is desired to be somewhat lessened to adjust and fine tune the separation force as desired. In addition, it should be noted that other magnet arrangements are possible, some of which are described in greater detail below.

In some cases magnet 104 which can be arcuate, and curve around the center A, in some cases matching the curvature of the curved channel 114, 116. However in this case, because an arcuate magnet 104 is used, the inner surface defined by the inner diameter of the arced magnet 104 will have a smaller surface area than the outer surface defined by the outer diameter of the arced magnet. The thicker the magnet 104, the larger the difference in surface area.

As is well known, magnetic flux is the strength of the magnetic force times the area around the pole. When arcuate magnets 104 are used, the magnetic flux on the inner surface of the arcuate magnets 104 is greater than the magnetic flux on the outer surface, since the surface area of the inner surface is smaller than the surface area of the outer surface. It is known that the number of magnetic force lines (magnetic field) from north to south must be the same for each magnet 104. With the surface area of the inner surface being smaller than that of the outer surface for arcuate magnets 104, it follows that the flux density on the inner surface will be higher than that of the outer surface. The higher flux density results in a concentrated load on the inner surface of the arcuate magnets 104 that is higher than the load on the outer surface. Thus the use of arcuate magnets 104 provides a net total resultant magnetic force that is lower than what is achievable under an optimized design since the flux field entering the attraction member 106 has a smaller surface area than what is needed to effectively disperse and distribute the magnetic flux field. This results in saturation of the portion of the attraction member 106, which causes under-utilization of the total available magnetic field. It has been found that the largest impact on magnet performance is the surface area of the face of the magnet 104 that is normal to the pole of the magnet 104.

In order to provide a balanced magnetic flux field, it may be desired for the inner annulus 108 of the magnet unit 43 to have an equal cross-sectional area, and/or equal volume, as the outer annulus 110. However, the inner annulus 108 can have a smaller diameter than that of the outer annulus 110. Thus as shown for example in FIGS. 2, 3 and 7, the inner annulus 108 of the magnet unit 43 can be thicker, in the radial direction, than the outer annulus 110, to provide an equal cross-sectional area and/or volume such that magnetic flux in the inner 108 and outer 110 annuli are equal.

In some existing designs, the flux field around the ends of one magnet 104 may be in the same direction as those of an adjacent magnet 104. These aligned flux forces produces a repelling force and can cause the magnets 104 to eject from the magnet unit 43, which can in turn cause the magnets 104 to be damaged or lost. The ejection force can also make assembly and repair of the magnet unit 43 difficult, and can require special processes and tools. Additionally, in some existing designs, as the magnets 104 are installed, each magnets 104 is biased to shift away from the adjacent magnet 104 due to the repelling magnetic fields. Thus, in this case the last few magnets 104 to be installed may require use of a special tool to reach into the magnet coupler 102, and push the aside the existing magnets 104 while installing the last few magnets 104.

The axial length of the channel 114, 116 (and/or the axial length of each magnet 104) can vary depending on the magnetic flux field desired to be generated at the end of the magnet coupler 102. The channel 114, 116 may have an axial length that is about equal to the axial length of the magnets 104 or slightly greater (within about 0.5% in one case, or about 1% in another case, or within about 5% in another case) such that the channel 114, 116 closely axially receives the magnets 104 therein. In addition, the axial position of the channel 114, 116 can be adjusted as desired. For example in the embodiment of FIGS. 4 and 5 the upstream portion 102a of the magnet coupler 102, and its channel portion 114, can have the same axial length as the downstream portion 102b and its channel portion 116. In this case the channels 114, 116 and magnets 104 are axially centered in the magnet coupler 102. In this scenario the magnetic force on each axial side of the magnet coupler 102 will be the same (assuming other conditions that can effect magnetic force are identical; for example, assuming the upstream 102a and downstream 102b portions are made of the same material, that their webs 112 have the same thickness, etc.).

Figure 12:
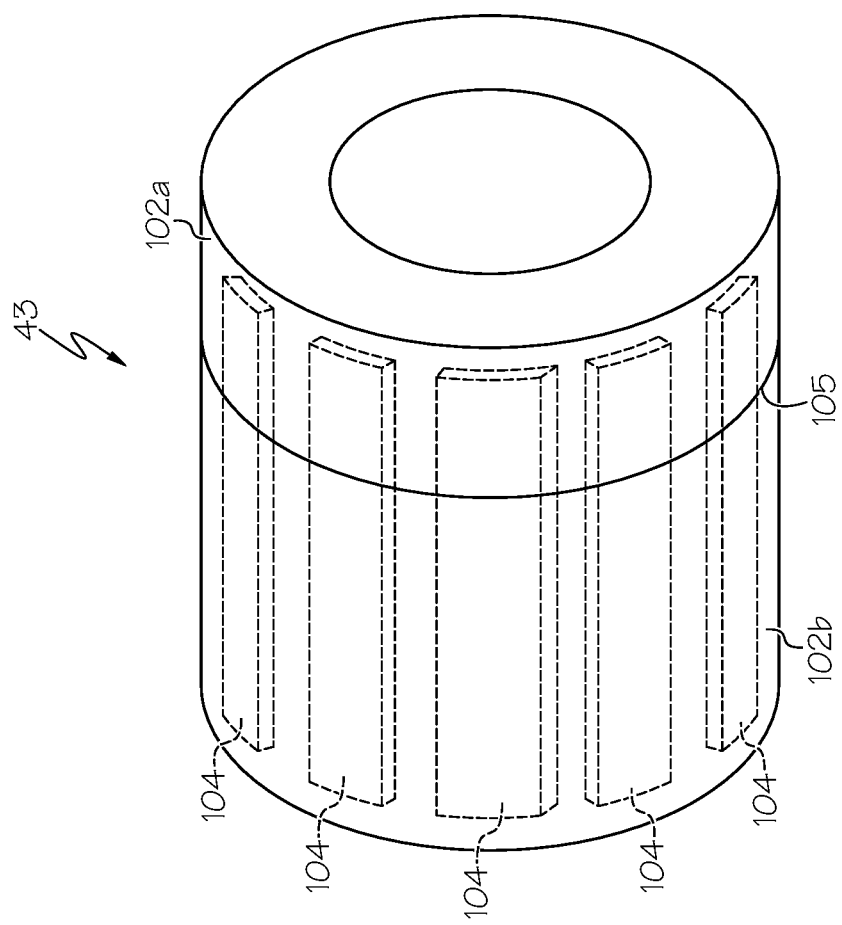
FIG. 12 is a front perspective view of an alternate embodiment of the magnet unit of FIGS. 4 and 5.

However if desired the magnet coupler 102/channels 114, 116 can be asymmetrical as shown in FIG. 12 such that one of the upstream 102a or downstream 102b portions and/or their channels 114, 116 are longer than the other. In this case more of the length of the magnets 104 are received in one of the upstream 102a or downstream 102b portions. For example, in one case one of the upstream 102a or downstream 102b portions can have up to ⅞th of the axial length of the combined length of the channels 114, 116 and/or up to ⅞th of the axial length of the magnets 104 therein, and the other one of the upstream 102a or downstream 102b portions can have the remaining (as little as ⅛th, in the described embodiment) of the length of the combined channels 114, 116 or magnets 104 therein. The upstream 102a or downstream 102b portion having the smaller portion of the magnets 104/channels 114, 116 will have the weaker magnetic flux field compared to the other having the larger portion of the magnets 104/channels 114, 116.

The magnetic force on each axial side of the magnet coupler 102 can also be varied depending upon the method/mechanism used to join the upstream 102a and downstream 102b portions of the magnet unit 43. In one case the upstream 102a and downstream 102b portions are welded at the joint 105 to form a welded joint therebetween, although care should be taken that the heat from the welding process does not damage the magnets 104. In another case the upstream 102a and downstream 102b portions each have threaded surfaces 103 as noted above and are thus joined at the joint 105 by a threaded connection, but could also be joined by a variety of other mechanisms/methods, such as press fit, rabbiting, retaining rings or the like.

The joint 105 in the magnet coupler 102 can cause a flux field leakage, which can vary depending upon the nature of the joint 105. For example, the magnetic flux field of the magnet coupler 102 can behave similar to fluids that want to travel the path of least resistance. The point of flux field leakage at the joint 105 of the magnet coupler 102 creates an area of resistance, which aids in the division of the magnet field in the magnet coupler 102. Thus, differing types of joints 105 will permit or block magnetic fields to pass therethrough by differing amounts.

For example, certain joints 105 may present a high flux field impedance and block magnetic fields, and thus tend to magnetically isolate the upstream 102a and downstream 102b portions, which can provide greater control over certain performance parameters. Other joints may have a relatively low flux field impedance to allow/transmit magnetic fields and thus tend to magnetically couple the upstream 102a and downstream 102b portions, which can provide greater magnetic coupling strength and separation force. If desired a gasket or other component can be positioned in, at or adjacent to the joint 105 to provide a more predictable control of the flux field impedance at the joint 105. The use of a gasket or component may be more practical when the upstream 102a and/or downstream 102b portions are made from a paramagnetic or diamagnetic material. The configuration and assembly of the magnet coupler 102 can thus be varied to adjust the force generated at each end thereof to adjust the breakaway features and other magnetic performance of the breakaway assembly 42.

In addition, the materials of the upstream 102a and/or downstream 102b portions of the magnet coupler 102 can be varied to adjust the magnetic field. For example, the upstream 102a and downstream 102b portions can be made of various and different ferromagnetic metals or alloys that have differing saturation points. The upstream 102a or downstream 102b portion that is made of material having a lower saturation point will generate a lower magnetic force. If only one side of the magnet coupler 102 is desired to generate a magnetic force, then one of the portions 102a, 102b can be made from a ferromagnetic material and the other portion can be made of a paramagnetic or diamagnetic material, such as 300 series stainless steel or 6000 grade of aluminum, and focus the magnetic flux at one end of the magnet coupler 102.

Magnets 104 can often be brittle and therefore it may be desired to position such magnets 104 to avoid receiving direct impacts, or dissipating loads. The magnet unit 43 disclosed herein protects the magnets 104 when they are housed in the closed channels 114, 116 of the magnet coupler 102, and the magnets 104 are protected from direct impact. The closed channels 114, 116 allows the end surfaces of the magnets 104 to be recessed such that the attraction member 106 does not physically engage or contact the magnets 104, but instead engages or contacts the magnet coupler 102. In addition, the efficient design and layout of the magnet unit 43 maximizes the use of the magnetic flux field and enables the magnet unit 43 to have a relatively small diameter, enabling the breakaway assembly 42 to have a smaller profile.

Another concern with magnets 104 is that they can be subject to corrosion. In order to address this issue magnets 104 are often coated or plated with various ferromagnetic metals, plastics or other materials. However, if these coatings are damaged the magnets 104 will be prone to corrosion. Thus care must be taken during assembly and storage of the breakaway assembly 42 to ensure the coating or plating of the magnets 104 is not damaged. The magnet coupler 102 helps to protect the magnets 104 from corrosion by protecting them during the installation process and during use. The design provides a magnet unit 43 with fully encapsulated magnets 104 that are sealed in an airtight and/or water-tight manner as a single sub-assembly that provides ease of handling and assembly, and provides protection to the encapsulated magnets 104.

Another issue that can arise is that magnets 104 may attract metal particles and other items that are attracted to a magnetic field. When such items or particles are positioned on the magnet 104 and/or attraction member 106, such items or particles can be trapped and impacted when the attraction member 106 and magnet unit 43 engage each other, thereby providing a pressure point that can damage or crack the attraction member 106 or magnet unit 43. However, in the current design the magnets 104 are positioned in the closed channels 114, 116. Thus the magnets 104 are protected, and the end face of the magnet unit 43, which can be made of a more rugged material, can bear the brunt of such impacts. In some cases, the radially outer surface of the magnet coupler 102 can be clad in aluminum or some other paramagnetic material to avoid collecting metal from the ambient environment onto the magnet coupler 102.

Some existing designs allow for direct exposure of the magnets to the atmospheric elements, which can lead to damage and/or corrosion. In addition some existing designs have inefficiencies in their magnetic design in that certain portions of the magnetic field must pass through significant areas of air and do not contribute to the magnetic force. In addition some designs distribute the magnetic flux field through an unduly large surface area due to the pattern of the magnets, decreasing the effective strength of the magnetic field. In contrast, in the design disclosed herein the magnets 104 can be fully encapsulated in the magnet coupler 102, and thus the magnet coupler 102 protects the magnets 104 from any corrosive material or debris. In addition, more magnetically efficient design is utilized.

FIGS. 14, 15 and 15A illustrate one particular embodiment wherein the magnet coupler 102 has a plurality of radially-aligned channels 116, each of which closely receives a magnet 104 therein. In this case the magnets 104 are generally aligned along a radial line of the breakaway assembly 42. The magnets 104 can be arranged such that the poles 118, 120 are in alternating directions as in the layout of FIG. 8. In addition in the case shown in FIG. 15 there can be twelve channels 116/magnets 104 that are spaced apart on center by 30 degrees. Each magnet 104 (and corresponding channels 114, 116) can have a thickness (extending, in the embodiment of FIG. 15, generally in the circumferential direction) of between about 0.025 inches 0.3 inches, and more particularly between about 0.1 and about 0.2 inches in another case; a height (extending in the axial direction) of between about 0.2 inches and about 1 inch, and more particularly between about 0.3 and about 0.4 inches in another case; and a length (extending in the radial direction) of between about 0.25 inches and about 2 inches, and more particularly between about 0.5 and about 1.25 inches in another case. The length and height dimensions described above may be reversed if desires. These dimensions of the magnets 104 and channels 114, 116 can also apply to the other embodiments described herein, regardless of orientation.

In the embodiment of FIGS. 14, 15 and 15A, the magnet unit 43 may include a magnet retainer 117, as best shown in FIG. 15A, can be used to secure the magnets 104 in the desired position and orientation. In particular the magnet retainer 117 can include a base ring 119 (which can be analogous to and/or define the web 112) and a plurality of generally wedge-shaped spacers 121 coupled to and extending axially away from the ring 119. The spacers 121 define the generally rectangular prism-shaped channels 116 in which the magnets 104 are received. The magnet unit 43 may include a retaining ring 123 (FIG. 14) received in a corresponding recess downstream of the magnet retainer 117 to keep the magnet retainer 117 and magnets 104 in place.

In this embodiment the magnet retainer 117 can be made of the same materials, such as ferromagnetic materials, as the attraction member 106 outlined above, and in one case is made of a magnetizable material. In this case the base ring 119 of the magnet retainer 117 can act as a shunting member, analogous to the web or end wall 112 of the embodiment of FIGS. 2-4, and the spacers 121 can become magnetized by the adjacent magnets 104. Although the magnet retainer 117 is shown in conjunction with the embodiment of FIGS. 14 and 15, it should be understood that the magnet retainer 117 can be used in other configurations, in place of the magnet coupler 102 if desired.

As outlined above the coupling mechanism 41, including the magnet unit 43 and the attraction member 106, provide the sole or primary separation force to the breakaway assembly 42. Starting in the coupled position, as shown in FIG. 2, the connectors 44, 46 are held together by the attractive force between the magnet unit 43 and the attraction member 106. This attractive force can be at a minimum of 100 lbs. as per the currently applicable U.S. standards/regulations, but can be set at various other levels as desired. Thus use of magnets, along with the various adjustment factors described above, helps to ensure that the separation force of the breakaway assembly 42 is reliable and predictable, with relatively small variances between differing assemblies 42. In one case the force required to separate the first 44 and second 46 connectors is in one case at least about 50 lbs., or in another case at least about 80 lbs. or in another case at least about 100 lbs., or in another case at least about 150 lbs., or in another case between about 80 lbs. and about 150 lbs., or at least about 300 lbs. in yet another case, or less than about 500 lbs. in one case, or less than about 300 lbs. in yet another case.

When it is desired to reconnect the breakaway assembly 42, the connectors 44, 46 can be pressed together in the axial direction, with the stems 84, 62 engaging each other and then opening the associated poppet valves 80, 54. When sufficient force is applied the magnet unit 43 is positioned sufficiently close to the attraction member 106 that the attractive force between those components overcomes the repulsive force applied by the springs 94, 74, and the breakaway assembly 42 is retained in the open position shown in FIG. 2.

Force Spike Accommodation—Spring

The fluid in the fluid path 32 can sometimes experience pressure spikes, pressure shocks or line shocks due to uneven operation of the pump 24, pressure imposed by operation of the user, or by other forces which may be relatively short in duration and tend to cause undesired separation (collectively termed a force spike herein). For example, in conventional fuel systems force spikes can be caused by a shut-off valve in the nozzle 18 closing the fluid path 32, while the pump 24 continues to operate for short period of time. Force spikes can also be caused by the user jerking on the hose 16, or from other sources. In many pressure spikes situations, the pressure spike has relatively low energy and may dissipate as it travels through the fluid path, since the fluid may be considered to be incompressible and have a relatively high energy transfer rate. However in this case the pressure spike may be present over a relatively long time period.

In some existing systems the force spike can apply a force to the poppet valve 54 of the downstream connector 46 or other components of the downstream connector 46. In existing single use breakaways, the connecting member that connects the upstream 44 and downstream 46 connectors can be relatively rigid and can shear or break when a sufficient force spike force is applied, causing an undesired separation. Some reconnectable breakaways are better at handling impulse loads generated from, for example, a user jerking on the hose 16, but a sufficiently high force by user force can still cause separation. Reconnectable breakaways that use compression or canted coil springs may lack sufficient response time; e.g. may not be able to transmit the load through the coils in sufficient time, which can lead to damage to the compression or canted coil spring.

Figure 13:
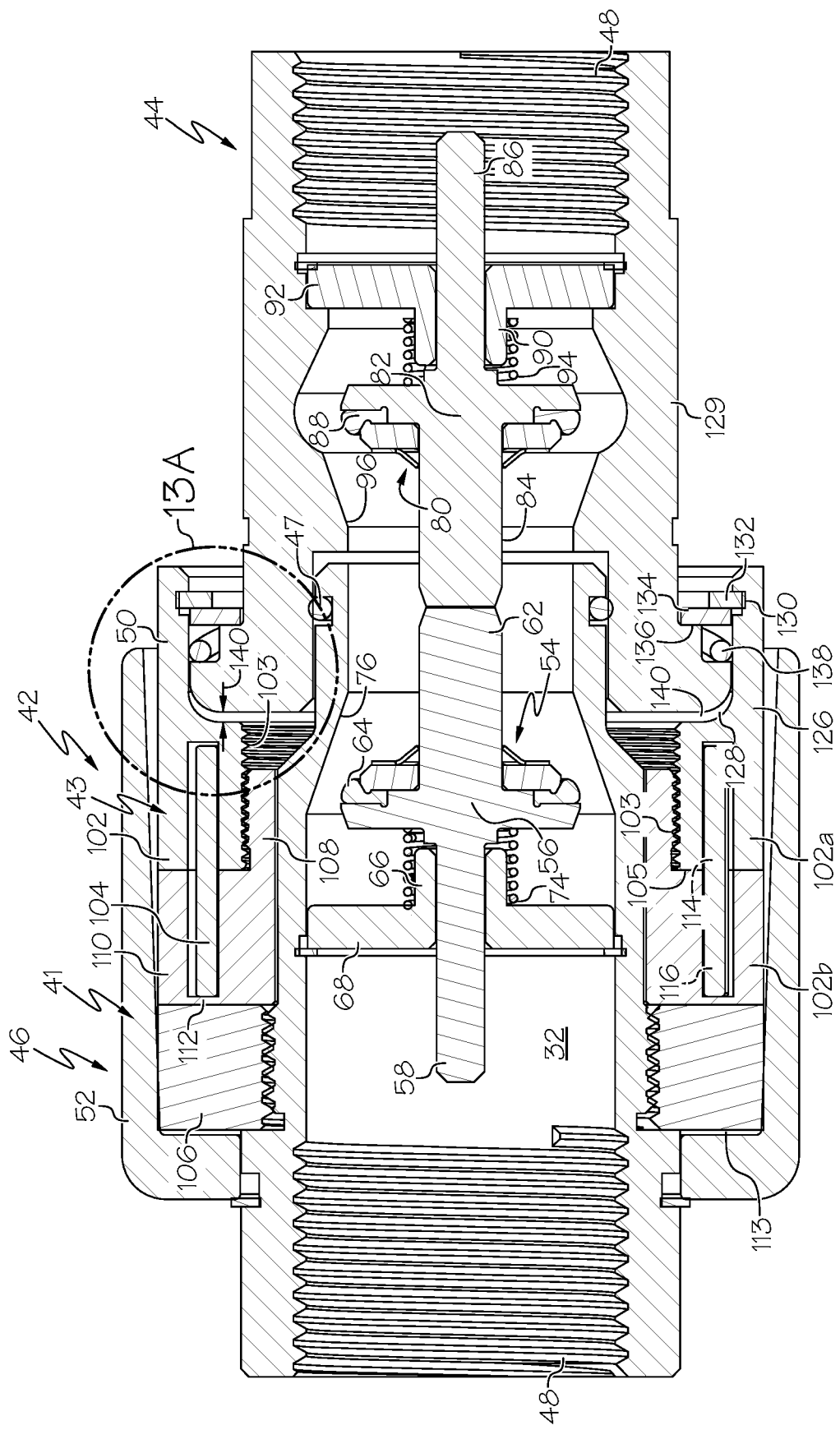
FIG. 13 is a side cross sectional view of the breakaway assembly of FIG. 2, shown accommodating a force spike.

The breakaway assembly 42 illustrated in for example FIGS. 2 and 13 is configured to accommodate force spikes without causing damage to the components and without undue undesired separation. In particular, upstream connector 44 can include an inner member 129 (e.g. defined in one case by portions of the upstream connector 44 other than the magnet unit 43) that has a limited range of axial movement or "float" relative to the magnet unit 43 to allow the assembly 42 to accommodate some force spikes without causing undesired separation events. The inner member 129 can be an annular component that extends entirely circumferentially around the fluid path 32. The magnet unit 43 can thus be considered to be movably mounted within the upstream connector 44, which enables the assembly 42 to accommodate force spikes in the system without causing separation.

In particular, the magnet unit 43/magnet coupler 102 can have a generally annular skirt 126, which can be part of or integral with the body of the magnet coupler 102. The skirt 126 is positioned upstream of the magnets 104, defining a shoulder 128 and an annular recess 130 positioned upstream of the shoulder 128. An annular retaining ring 132 is positioned in the recess 130. The magnet unit 43 further includes a retaining washer 134 positioned adjacent to, and axially downstream from, the retaining ring 132.

The inner member 129 has a lip 136 positioned adjacent to, and axially spaced apart from, the retaining washer 134 when the assembly 42 is in the position shown in FIG. 2. A first gap 137 is positioned between the lip 136 and the retaining washer 134 during normal operating conditions. A biasing element or resilient component 138 is positioned in a recess of the inner member 129 and can be in compression and engaging both the inner member 129 and the retaining washer 134, and can include or take the form of a wire wave spring or other spring or resilient member having a predetermined preload. The resilient component 138 biases the inner member 129 to its rest or axial inner position, shown in FIG. 1, and can be fluidly isolated from the fluid path 32.

Figure 13A:
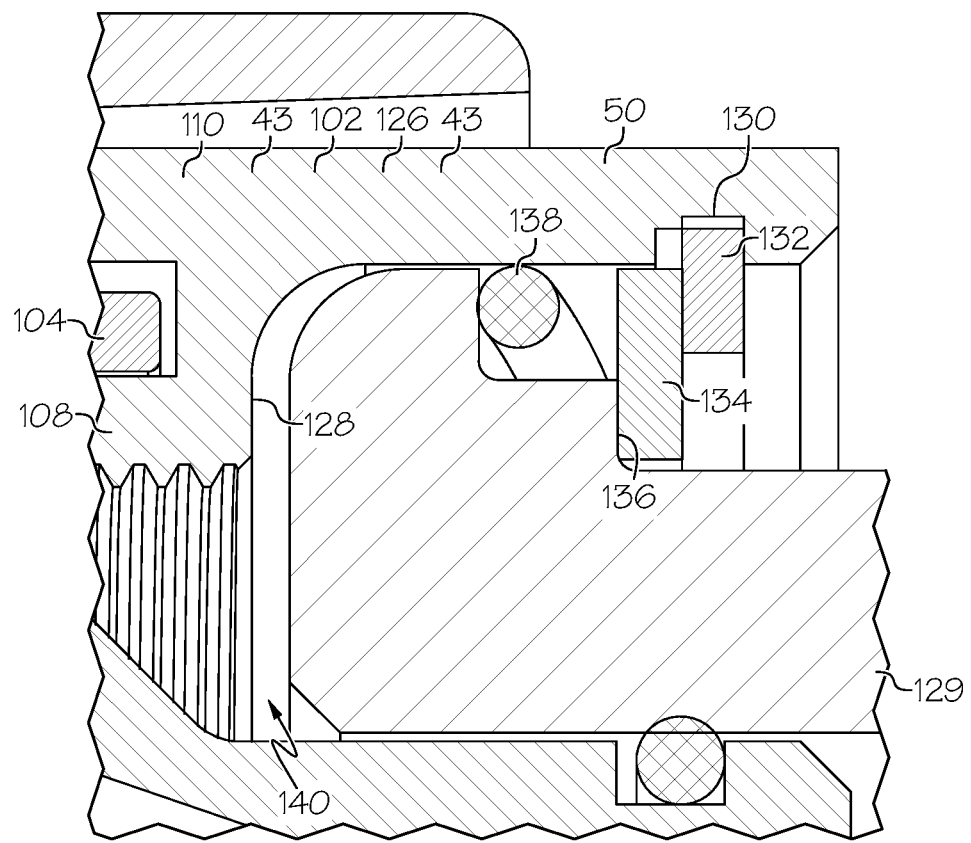
FIG. 13A is a detail view of the area indicated in FIG. 13.

When a pressure spike propagates through the fluid path 32 and/or an impulse load is applied (e.g. by a user) the applied force can cause the inner member 129 and the poppet valve 80 of the upstream connector 44 (carried therewith) to move axially away from the magnet unit 43 and upstream connector 44. As shown in FIGS. 13 and 13A in one case the relative movement can appear as the inner member 129 and poppet valve 80 moving upstream, as compared to FIG. 2, to an actuated or axial outer position. The inner member 129 can move upstream in a relative direction until the lip 136 of the inner member 129 engages the retaining washer 134, thereby eliminating the first gap 137 of FIG. 2, while introducing a second gap 140 as shown in FIGS. 13 and 13A between the shoulder 128 and the downstream face of the inner member 129. The magnet unit 43 and the attraction member 106 remain magnetically coupled during such force-spike induced movement, and the full stroke of the force-spike accommodating movement is defined by the first gap 137 of FIG. 2, which gap 137 is eliminated in FIG. 13 during full movement of the inner member 129. Of course, the inner member 129 does not necessarily need to move a full stroke to accommodate force spikes, and the gap 137 will in such cases be reduced/narrowed but not necessarily eliminated. In the manner the upstream connector 44 can have a gap introduced therein to accommodate force spikes, while the upstream 44 and downstream 46 connectors remain coupled.

If the force spike overcomes the resistance of the resilient component 138, then the inner member 129/assembly 42 will shift axially out, up to a fixed distance, to its force-spike accommodating position shown in FIG. 13. The associated poppet valve 80 remains open and does not shift to its closed position, even when the inner member 129 is in its force-spike accommodating position. The inner member 129 can move to its force-accommodating position, while the remaining portion of the connector 44 and/or the other connector 46 remain relatively fixed. Since the spike forces are typically a quick pulse, once the inner member 129 shifts to the pressure-spike or force-spike accommodating position and the force spike has sufficiently diminished, the resilient component 138 will quickly urge the assembly 42 back to its position shown in FIG. 2, wherein the downstream face of the inner member 129 engages and is pressed against the shoulder 128 of the magnet unit 43. It should be noted that, when in the force-spike accommodating position shown in FIG. 13, a sufficient separation force, applied either externally or by a sufficiently high pressure spike or combinations thereof, will still cause the magnet unit 43/upstream connector 44 to separate from the attraction member 106/downstream connector 46 in a separation event as described above.

The assembly 42 can accommodate force spikes that propagate in both the upstream direction and the downstream direction. In particular, both such force spikes can cause the same relative movement of the assembly from its rest position of FIG. 2, as shown in FIGS. 13 and 13A. Thus the resilient component 138 can accommodate and absorb the pressure or spike force in either direction. In addition, when a user jerks on the hose 16, applying a direct physical force that tends to want to separate the assembly 42, the resilient component 138 can help to absorb such forces and reduce breakaway events.

The resilient component 138 will have a predetermined preload force and compression point load. The resilient component 138 and maximum size of the gap 140 will both limit the stroke of the inner member 129 to a predetermined distance to ensure that the seal 47 on the upstream outer circumferential end of the downstream connector 46 is not pulled out of the bore, or out of contact with, of the inner surface of the upstream connector 44 when the assembly 42 is in its force-spike accommodating position. Thus the maximum stroke distance (e.g. axial dimension of the gap 137 and/or gap 140, possibly shortened by the compressed length of the resilient component 138) may be relatively short, such as less than about 5/16" in one case, or less than about 1/4" in another case, or less than about 1/8" in another case, or less than or equal to about 1/16" in another case, and greater than about 1/32" in yet another case.

The force required to cause the assembly 42 to move to its force-spike accommodating position may be set to a lower value than the separation force. For example, if the separation force is set to 250 lbs., then the force required to cause the assembly 42 to move to its force-spike accommodating position can be set at a value less than 250 lbs., for example about 175 lbs. in one case. The assembly 42 may be able to accommodate various levels of force spikes, that are less than the separation force, such at least about 40 lbs. in one case, or at least about 60 lbs. in another case, or at least about 80 lbs. in yet another case, or greater than about 25% of the separation force in one case, or greater than about 50% of the separation force in another case, or less than the separation force in one case, or less than about 90% of the separation force in yet another case. The force required to induce force-spike accommodation should be high enough to accommodate meaningful force spikes, but not so high as to risk being ineffective and effectively overridden by a breakaway event, and not so low as to enable frequent force-spike accommodation which can cause fatigue of the various components that accommodate force spikes.

In such a force spike event, the energy of the force spike is absorbed by the resilient component 138. This accommodation of force spikes reduces unintended separations and improves the fuel dispensing experience. In addition, allowing the inner member 129 to move/float relative to the remainder of the upstream connector 44 isolates the joint 105 of the magnet coupler 102 from fluid spike forces. Instead of applying forces to the joint 105, the spike forces are applied to annular areas, such as the retainer washer 134, retaining ring 132, and recess 130 of the assembly 42, which can be designed and configured to accommodate applied loads.

In addition or in the alternative, instead of having the magnet unit 43 move or "float" to accommodate force spikes, the attraction member 106 can instead be configured to "float" in the downstream connector 46 such that the downstream connector 46 can accommodate force spikes in either direction. In this embodiment, the resilient component 138 (and retaining ring 132 and retaining washer 134, if desired) are positioned adjacent to the attraction member 106 (e.g. in gap 113 in one case) in manners which are apparent to a person of ordinary skill in the art as taught by the illustrated embodiments in FIGS. 2 and 13. In this case, when there is a force spike in the fluid path 32, the attraction member 106 may move slightly relatively axially, such as downstream, and the associated resilient component 138 is compressed, absorbing the force of the force spike. Once the force spike is dissipated, the attraction member 106 returns to its original position as biased by the spring/resilient member 138.

As outlined above the magnet unit 43 and/or attraction member 106 can use springs or other energy-absorbing devices to accommodate force spikes in the system. In the case where both the magnet unit 43 and attraction member 106 are configured to accommodate force spikes, the force-spike accommodation system can be arranged to accommodate force spikes in a staged manner. For example, the resilient components 138 can have different spring constants or otherwise be arranged to be activated at different levels of force. In this case one of the force-spike accommodation systems can be activated at a lower pressure or force, and the other one of the force-spike accommodation systems can be activated at a higher pressure or force. In one case the higher force-spike accommodation system can be configured to be activated just as the lower force-spike accommodation system reaches its limit; that is in one case as or just before the gap 137 is eliminated. Such a "double floating" system can thereby bracket spike forces and accommodate them in a more efficient manner, and provide the ability the accommodate more powerful force spikes.

It should be further understood that the force spike accommodation system, while shown herein in conjunction with a magnetic coupling system 41, is not necessarily limited to use with such a magnetic coupling system 41. Instead the force spike accommodation system and features can be used with nearly any system or component for coupling the first 44 and second 46 connectors, including mechanical coupling systems.

Force Spike Accommodation—Magnetic

Figure 16:
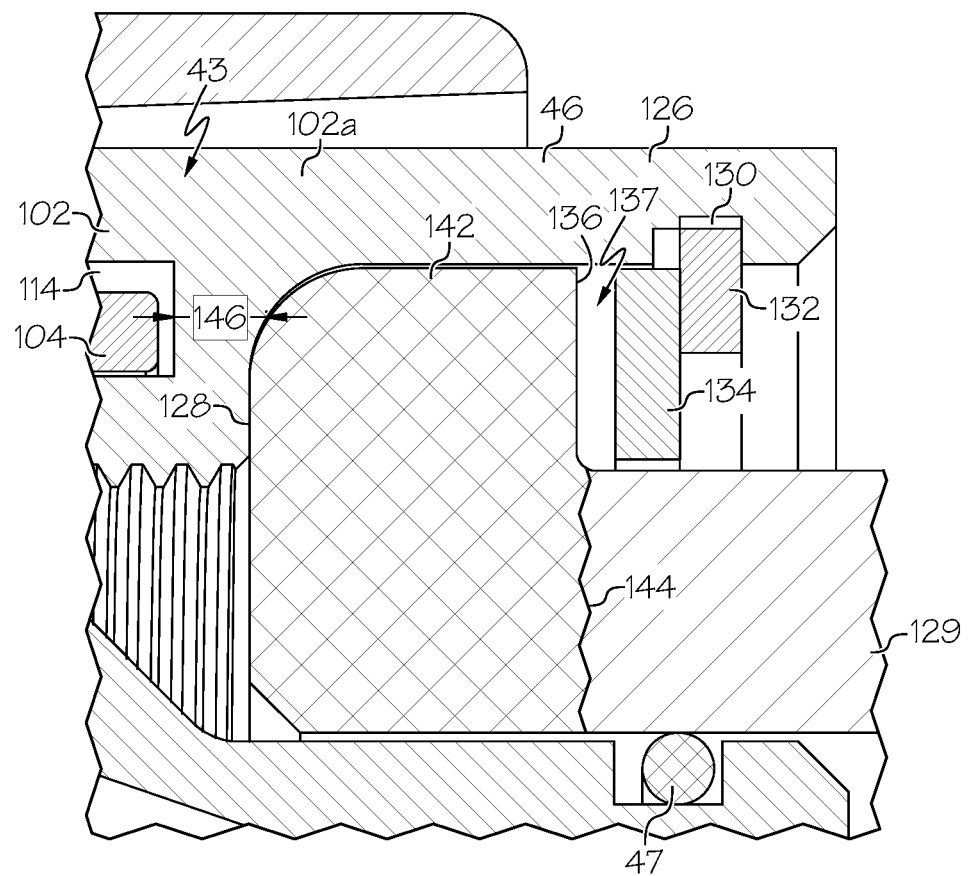
FIG. 16 is a detail cross section of the area indicated in FIG. 13A showing another embodiment of the breakaway assembly with a magnetic assembly for accommodating a force spike.
Figure 16A:
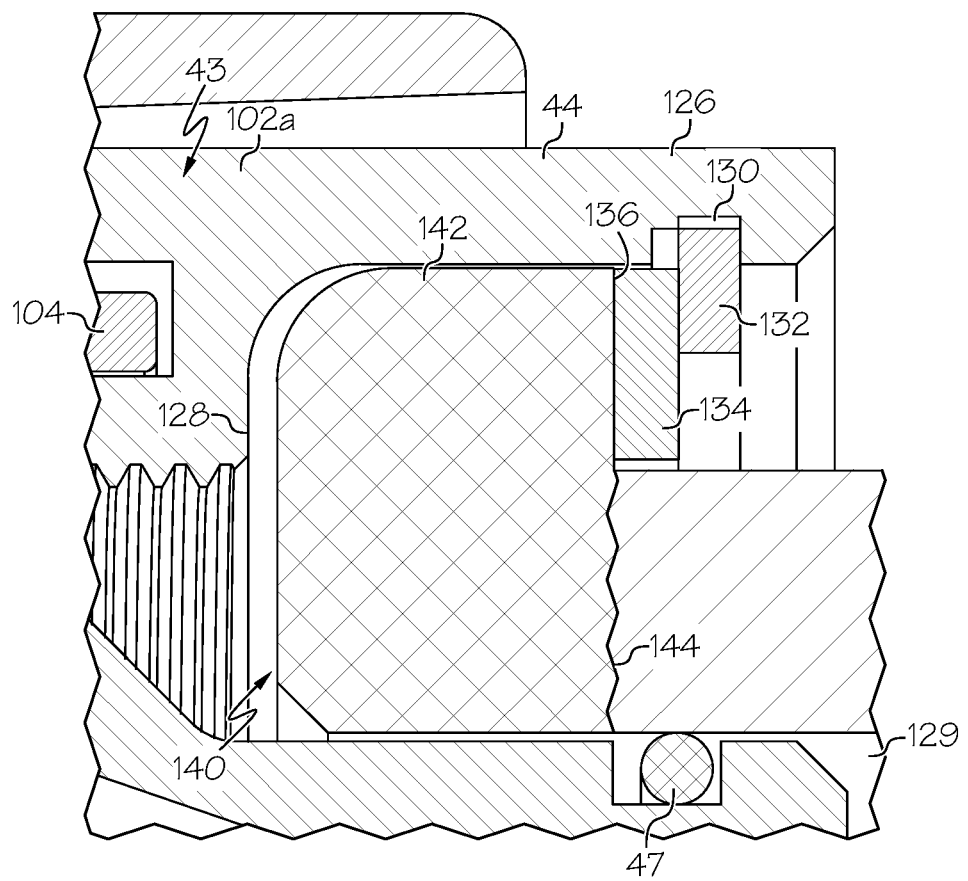
FIG. 16A shows the components of FIG. 16 in the process of accommodating a force spike.

In a further alternative embodiment for accommodating force spikes, rather than using the resilient component 138, as shown, in one case, in FIG. 16 a magnetizable material 142 can be coupled (e.g. by a schematically-shown threaded joint 144 in one case, but various other coupling mechanisms can be used) to the inner member 129 of the upstream connector 44, and the magnets 104 can act as a biasing element to aid in accommodating force spikes. The magnetizable material 142 is positioned adjacent to, but not directly coupled to, the shoulder 128 of the magnet unit 43/magnetic coupler 102. The magnetizable material 142 can be for example a ferromagnetic alloy member having a saturation point greater than 1.25 Tesla. The magnetizable material 142 can be magnetically attracted to the magnets 104/magnet unit 43 (with a force lower than the separation force) to allow floating of the magnet unit 43 to accommodate line shock or pressure shock as described above. When a line shock, impulse load or force spike of sufficient force is experienced in the embodiment of FIG. 16, the inner member 129 will move relatively upstream (and/or the connector 46 will move relatively downstream), narrowing or closing the gap 137, while another gap 140 (FIG. 16A) opens between the magnetizable material 142 and the shoulder 128.

When a magnetic force is used to control and accommodate force spikes as per the embodiment of FIG. 16 for example, one end (e.g. the upstream end) of the magnet unit 43 may be desired to have a lower magnetic force than the other end (e.g. the downstream end) to ensure the force required to cause the assembly 42 to move the assembly 42 to its force-spike accommodating position (FIG. 16A) is lower than the separation force. This can be accomplished in some of the manners outlined above, such as the having the downstream portion 102b of the magnetic coupler 102 being made of a material having a higher saturation point then the upstream portion 102a, thus increasing its efficiency and separation force, or by use of a gasket at the joint 105, by varying position of the magnets 104 in the magnet coupler 102, by increasing the thickness of the web, etc. In one case the one of the portions 102a/102b (the downstream portion 102b in one case) of the magnetic coupler 102 can be made of a material having a saturation point of greater than 1.25 Tesla, and the other portion 102a/102b (the upstream portion 102a) can be made of a material having a saturation point of less than 1.25 Tesla, or be made of a paramagnetic or diamagnetic alloy or material. In the case where a spring or other resilient component 138 is used to accommodate force or pressure spikes, the upstream portion 102a of the magnetic coupler 102 can be made of a paramagnetic or diamagnetic material, since a magnetic field may not be needed on the upstream side of the magnet coupler 102.

Another way to provide a reduced magnetic force on the upstream end of the magnet unit 43/magnetic coupler 102 would be to simply increase the thickness of the web 146 (e.g. the axially extending thickness at the upstream end) of the upstream portion 102a, which shunts the magnetic flux to reduce the magnetic force to the desired level. However it has been found that if the web thickness 146 is made too great (greater than about ¼" in one case) the attraction force may be lowered too much, and thus may not be practical. On the other hand, if the web thickness 146 is too small (less than about ¹⁄₆₄" in one case) the strength/integrity of the magnet unit 43 may be compromised. Another way to provide a reduced magnetic force on the upstream end of the magnet unit 43 would be to reduce the diameter of the magnet unit 43, which reduces magnetic efficiency.

It should also be understood that the magnetic-based system for dissipating force spikes (FIGS. 16 and 16A) can be used in combination with the spring-based system for dissipating force spikes (FIGS. 1, 12, 13 and 15) to provide two separate systems, usable together, for accommodating force spikes, acting either on the same components, or on different components to provide staged force spike accommodation as outlined above. It should also be noted that the magnetic pressure dissipation system can also be used in the downstream connector 46, with corresponding structure to that described above being provided and adjusted as needed.

Thus, it can be seen that when the magnet unit 43 is used to accommodate force spikes, the magnet unit 43 serves a dual purpose in controlling the separation force and also controlling the force-spike accommodation force. Accordingly the magnet unit 43 provides a usable magnetic field on both axial ends thereof, where the relative strength of the magnetic field on each end can be controlled as desired. Alternatively the magnet unit 43 may provide a usable magnetic field on only one end thereof Relatively Higher-Pressurized Safety Breakaway The breakaway assembly 42 described above is generally designed for use with convention fuels, such as gasoline, diesel, etc. that are not stored and/or delivered under significant pressures. However the magnetic breakaway design and/or similar or analogous structures can also be used in systems that store and deliver fuel or fluid under relatively high pressure, such as CNG, hydrogen, LPG or the like. In these cases the fuel can be stored and dispensed under pressure (in one case in the range of between about 70 psi and about 10,000 psi, and in another case between about 2,900 psi and about 3,600 psi, or at least about 70 psi in one case, of at least about 150 psi in one case, or at least about 2,000 psi in another case, or in another case at least about 2,900 psi, or less than about 3,600 psi in one case, or less than about 10,000 psi in another case).

The breakaway assembly 42' shown in FIGS. 17-22 is somewhat analogous to those shown in FIGS. 2-16, with the same reference numbers (either with or without a "prime" indicator and/or a letter indicator in certain cases) used for the same or analogous components, although the flow direction in the drawings of FIGS. 17-22 is opposite to that of the FIGS. 2-16 embodiment. Thus for example the breakaway assembly 42' of FIGS. 17-22 includes the first or upstream connector 44' and the second or downstream connector 46', and fluid to be dispensed flows in a left-to-right direction. The first connector 44' includes a connection structure 147 having a series of generally axially-extending, circumferentially spaced flanges or jaws 148 that can releasably engage a circumferentially extending recess/ramp 150 on the second connector 46', as will be described in greater detail below. The second connector 46' has a neck portion 154 which carries the recess 150 on a radially outer surface thereof, and a fixed shaft member 153 is positioned in the second connector 46'. The shaft member 153 has an inner cavity 155 thereon and facing upstream. A poppet valve 80' is positioned in the second connector 46'. A valve 151, such as a curtain valve having curtain valve member, shuttle valve, closure valve or slider 152 is movably positioned in the first connector 44', and movable between an upstream/open position, shown in FIG. 17, and a downstream/closed position, shown in FIGS. 18 and 19.

The first connector 44' includes a center shaft or tubular structure 158 about which the slider 152 is movably/slidably mounted. The slider 152 includes an annular sealing structure 156 that closely fits about the center shaft 158. The center shaft 158 can be hollow, having a central cavity 160 therein and a plurality of radially-extending openings 162 (or at least partially radially-extending openings 162 which can extend primarily radially, or form an average angle of greater than 45 degrees relative to a central axis in one case, or greater than 65 degrees in another case, or strictly radially extending in yet another case) which form part of the fluid path 32, positioned adjacent to a downstream end thereof, that are in fluid communication with the cavity 160. The first connector 44' has a pair of seals 164, 166 positioned on the center shaft 158. The upstream seal 164 is positioned upstream of the openings 162, and the downstream seal 166 is positioned downstream of the openings 162.

Figure 17:
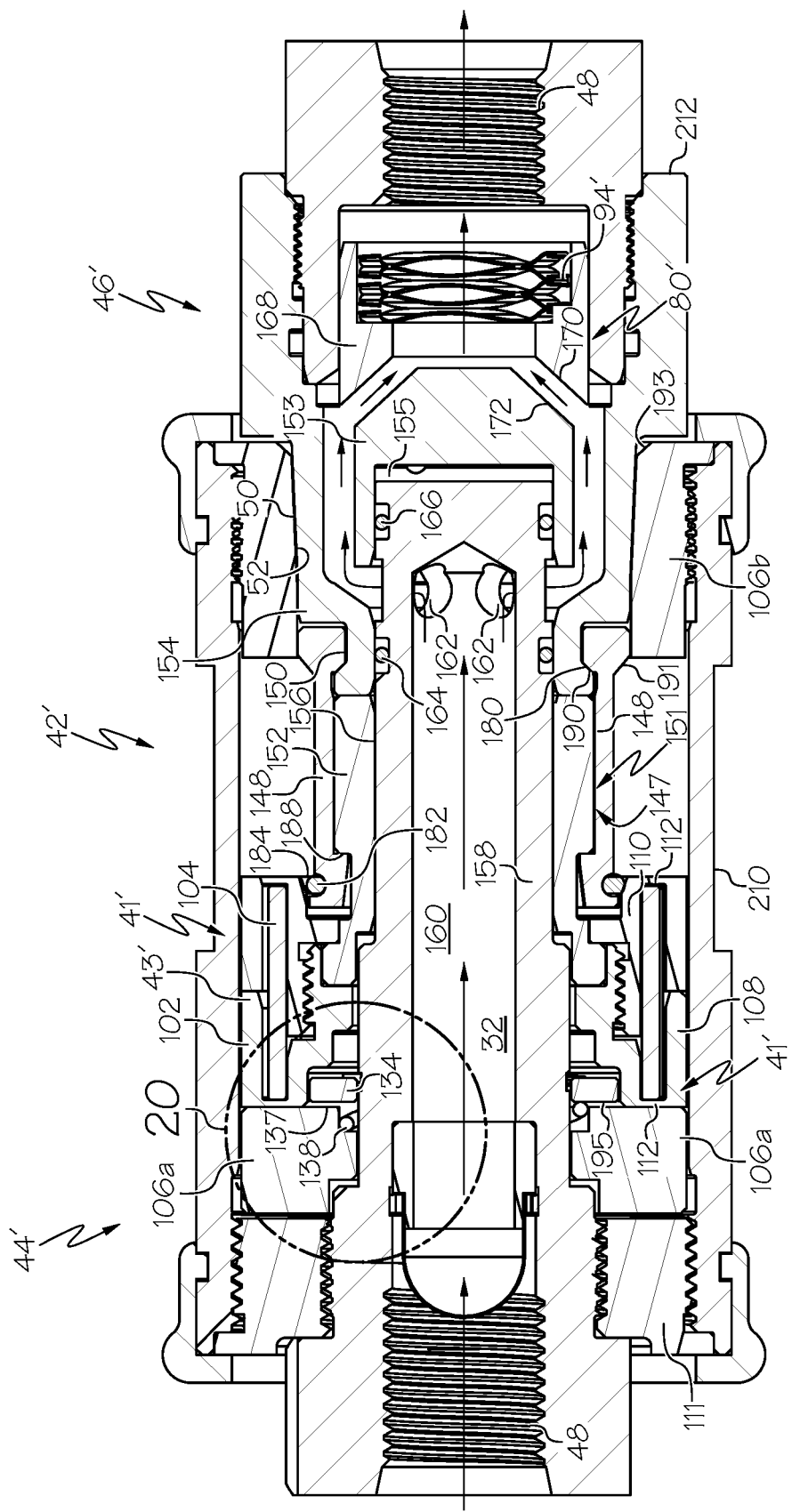
FIG. 17 is a side cross sectional view of another embodiment of a breakaway assembly, shown in its connected configuration.

When the assembly 42' is in its connected configuration, as shown in FIG. 17, the downstream end of the center shaft 158 is received in the inner cavity 155 of the shaft member 153. In this position the downstream seal 166 of the first connector 44' engages the radially inner surface of the shaft member 153 (e.g. the radially outer surface of the inner cavity 155) and the upstream seal 164 of the first connector 44' engages the radially inner surface of the distal end of the neck portion 154, to seal the fluid in the fluid path 32 as fluid flows from the upstream connector 44' to the downstream connector 46' as shown by the arrows in FIG. 17.

Figure 18:
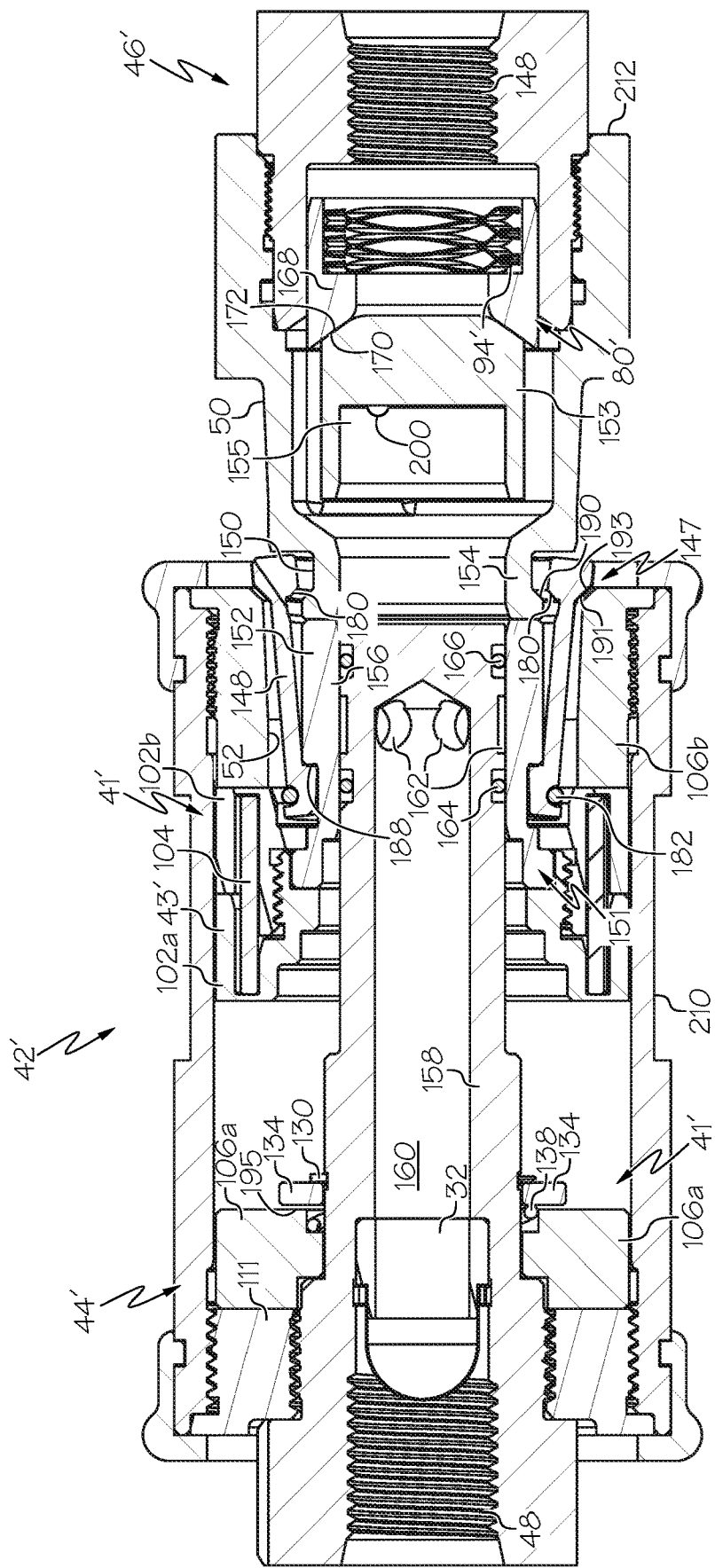
FIG. 18 is a side cross sectional view of the breakaway assembly of FIG. 17, with the shuttle moved downstream as a step of disconnection.
Figure 19:
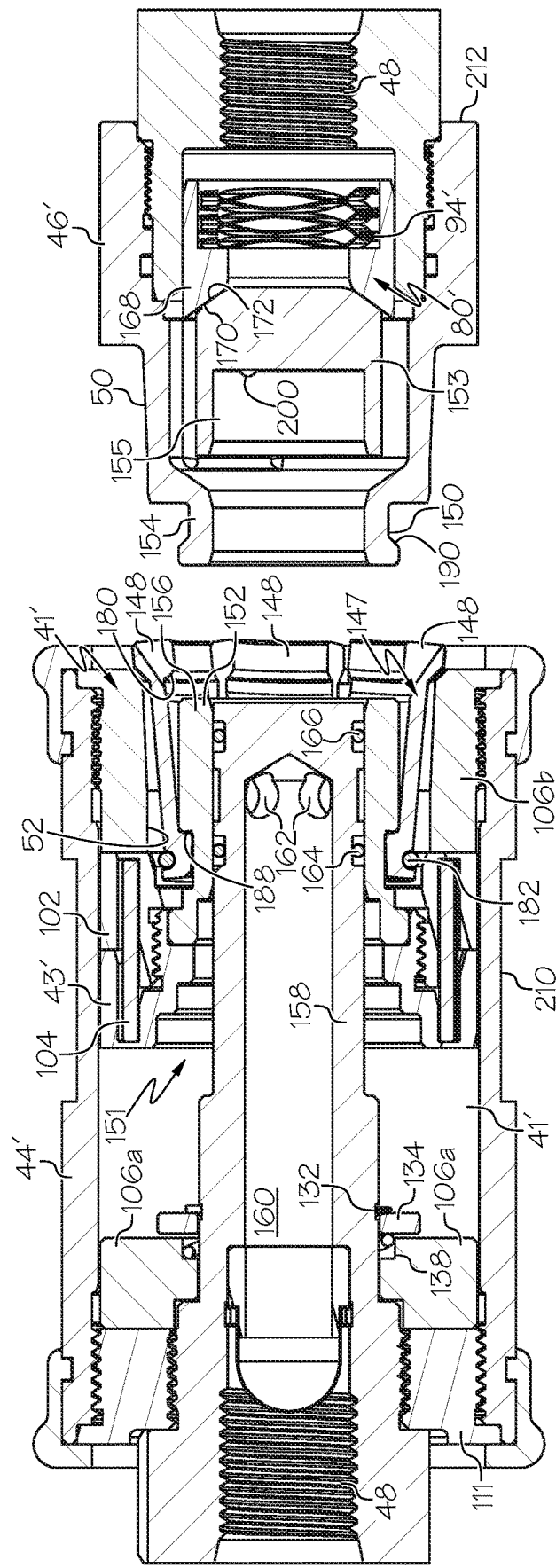
FIG. 19 is a side cross sectional view of the breakaway assembly of FIG. 17, shown in its disconnected configuration.

In this manner fluid can flow down the cavity 160 of the center shaft 158, radially outwardly through the openings 162 and encounter the poppet valve 80'. The poppet valve 80' includes a movable member 168 having a sealing surface 170, and is biased to an upstream/sealing position by spring 94'. When the poppet valve 80' is closed its sealing surface 170 sealingly engages valve seat 172 on the shaft portion 53, as shown in FIGS. 18 and 19. In contrast, when fluid of sufficient pressure acts on the poppet valve 80', the movable member 168 moves downstream, compressing the spring 94', and allowing fluid to flow past the poppet valve 80' as shown in FIG. 17. Thus when the assembly 42' is in the configuration shown in FIG. 17, under sufficient pressure fluid can flow to the nozzle 18 in the direction of the arrows shown in FIG. 17.

When an axial separation force is applied to the first 44' and second 46' connectors, the slider 152 moves to a downstream position (in a manner which will be described in greater detail below), as shown in FIG. 18. In this position the sealing structure 156 of the slider 152 extends over, and sealingly engages/covers, the openings 162 of the center shaft 158, and thus blocks fluid flow as or in the manner of a curtain valve. The sealing structure 156 of the slider 152 simultaneously sealingly engages both seals 164, 166 of the upstream connector 44' to provide a secure seal. When first 44' and second 46' connectors are properly and fully reconnected, the slider 152 is retracted or moved upstream (in a manner which will be described in greater detail below), and the openings 162 are uncovered such that fluid can flow through the assembly 42'.

As noted above, the connection structure 147 can include a plurality of axially-extending flanges 148 on the first connector 44', wherein each flange 148 is circumferentially spaced from any adjacent flanges 148. Each flange 148 may be movable or pivotable in the radial direction (e.g. be moved radially outwardly from the position shown in FIG. 17 to the position shown in FIGS. 18 and 19). Each flange 148 may be biased to be in its radially outward positions shown in FIGS. 18 and 19, by a spring 182 or the like that extends circumferentially around the base ends of the flanges 148 and urges the flanges 148 radially outwardly by a lever force, pivoting about pivot location 188. Each flange 148 may also be axially coupled to and axially movable with the slider 152.

When the slider 152/connection structure 147 is in its upstream position or first axial position, as shown in FIG. 17, the downstream ends of the flanges 148 are positioned radially inside the attraction member 106b and prevented from moving radially outward. This means that the flanges 148 are positioned in the recess 150 and securely grip the downstream connector 46', preventing separation. In contrast, when the slider 152/connection structure 147 moves to its downstream or second axial position, as shown in FIG. 18 the downstream end of the flanges 148 protrudes axially beyond the attraction member 106, enabling the flanges 148 to move radially outwardly, out of the recess 150 and thereby release the downstream connector 46'. In this manner, the slider 152 can be positively axially coupled to the downstream connector 46' when the assembly 42' is in the coupled configuration, and the slider or closure valve 152 is released and not axially coupled to the downstream connector 46' when the assembly 42' is in the disconnected configuration. In other words the downstream connector 46' can be configured to move the slider or closure valve 152 to the closed position when the assembly 42' moves from the connected configuration to the disconnected configuration.

Each flange 148 may include a surface 180 that is angled (i.e. extending at a non-parallel angle relative to the central axis) on its radially inner surface. The upstream connector 46' may include a ramp or angled surface 190 that engages the ramp or angled surfaces 180 when the slider 152 is in its upstream position as shown in FIG. 17. When the slider 152 slides to its downstream position, as shown in FIGS. 18 and 19, the angled surfaces 180/190 slide axially relative to each other, and the flanges 148 are thereby positively moved to their radially outer position, releasing the downstream connector 46'. In contrast, when the slider 152 moves returns to its upstream position (e.g. moving from the position of FIGS. 18/19 to the position of FIG. 17), angled surfaces 191 on the radially outer surfaces of the flanges 148 engage an angled surface 193 on the attraction member 106b to positively move the flanges 148 to their radially inner position. However it should be understood that the connection structure 147 can take any of a wide variety of other forms or mechanisms for releasably coupling the slider 152 and the downstream connector 46', such as various ramps, interengaging fingers, interengaging geometry, magnetic couplings, spring connections, etc.

A coupling mechanism 41' can be used to secure the slider 152 in its upstream position and thereby axially secure the upstream 44' and downstream 46' connectors, and to solely or primarily supply the separation force to the breakaway assembly 42'. The coupling mechanism 41' can include a magnet unit 43' that is coupled to or forms part of the slider 152 that is the same as or analogous to the magnet unit 43' described above. However in this case the magnet unit 43' is coupled to the slider 152 and movable with the slider 152 as will be described in greater detail below. In addition, the assembly 42' can include a pair of attraction members 106a, 106b that are the same as or analogous to the attraction member 106 outlined above. In particular, the attraction member 106a of the embodiment of FIGS. 17-22 is positioned at an upstream end of the upstream connector 44', and magnetically engages the magnet unit 43'/slider 152 when the magnet unit 43'/slider 152 is in its upstream position to provide the separation force. In addition, the upstream attraction member 106a may axially float in the system such that the attraction member 106a is axially movable, but constrained in such movement in both axial directions by a fixed body 111 and retaining washer 134, respectively. The attraction member 106*a* may be biased in the upstream direction by spring or resilient element 138.

The attraction member 106*b* is positioned at a downstream end of the upstream connector 44', and magnetically engages the magnet unit 43'/slider 152 when the magnet unit 43'/slider 152 is in its downstream position, to provide a desired reconnection force. The magnet unit 43' can be magnetically attracted to the attraction members 106*a*, 106*b*, and by the same or variable amounts by for example adjusting the properties of the magnet unit 43' and/or attractions members 106*a*, 106*b* as outlined above. In one embodiment, the attraction of the magnet unit 43' to the downstream attraction member 106*b* (when the slider 152 is in its downstream position) is greater than the attraction of the magnet unit 43' to the upstream attraction member 106*a* (when the slider 152 is in its upstream position). Thus in this case the reconnection force of the assembly 42' may be greater than the separation force. This can provide a safety feature as described in greater detail below.

When the assembly 42' is in the fully connected configuration shown in FIG. 17, the slider 152 is in its upstream position, and held in position due to magnetic engagement between the magnet unit 43' and the attraction member 106*a*. During a breakaway event, a downstream axial force is applied to the second connector 46', which is transmitted to the slider 152 due to the engagement of the ramp 190 of neck portion 154 and the angled surfaces 180 of the flanges 148. Accordingly, an applied separation force is applied to, and must first overcome, the magnetic attraction between the magnet unit 43' and the upstream attraction member 106*a*, which causes the slider 152 to move to its downstream position shown in FIG. 18. As the slider 152 moves to its downstream position the distal end of the flanges 148 move axially clear of the attraction member 106*b*, which enables the flanges 148 to move to their radially outward position as biased by the spring 182. This, in turn, causes the flanges 148 to release the downstream connector 46', and the slider 152 fully moves to its downstream position.

When the downstream connector 46' is separated from the upstream connector 44', the downstream connector 46' imparts a downstream force to the slider 152, thereby securely pulling the slider 152 into its closed position to seal the openings 162 by the seals 164, 166 as described above. In addition since the slider 152 is moving downstream, the force of the pressurized fluid upstream of the slider 152 urges the slider 152 to its closed position thereby providing a reliable seal. As the downstream connector 46' separates from the upstream connector 44' the poppet valve 80' in the downstream connector 46' is closed as biased by its spring 94, which can overcome the reduced pressure in the fluid path 32 due to closure of the openings 162. Thus, after a separation event both connectors 44', 46' can be fluidly sealed in a reliable manner.

Figure 21:
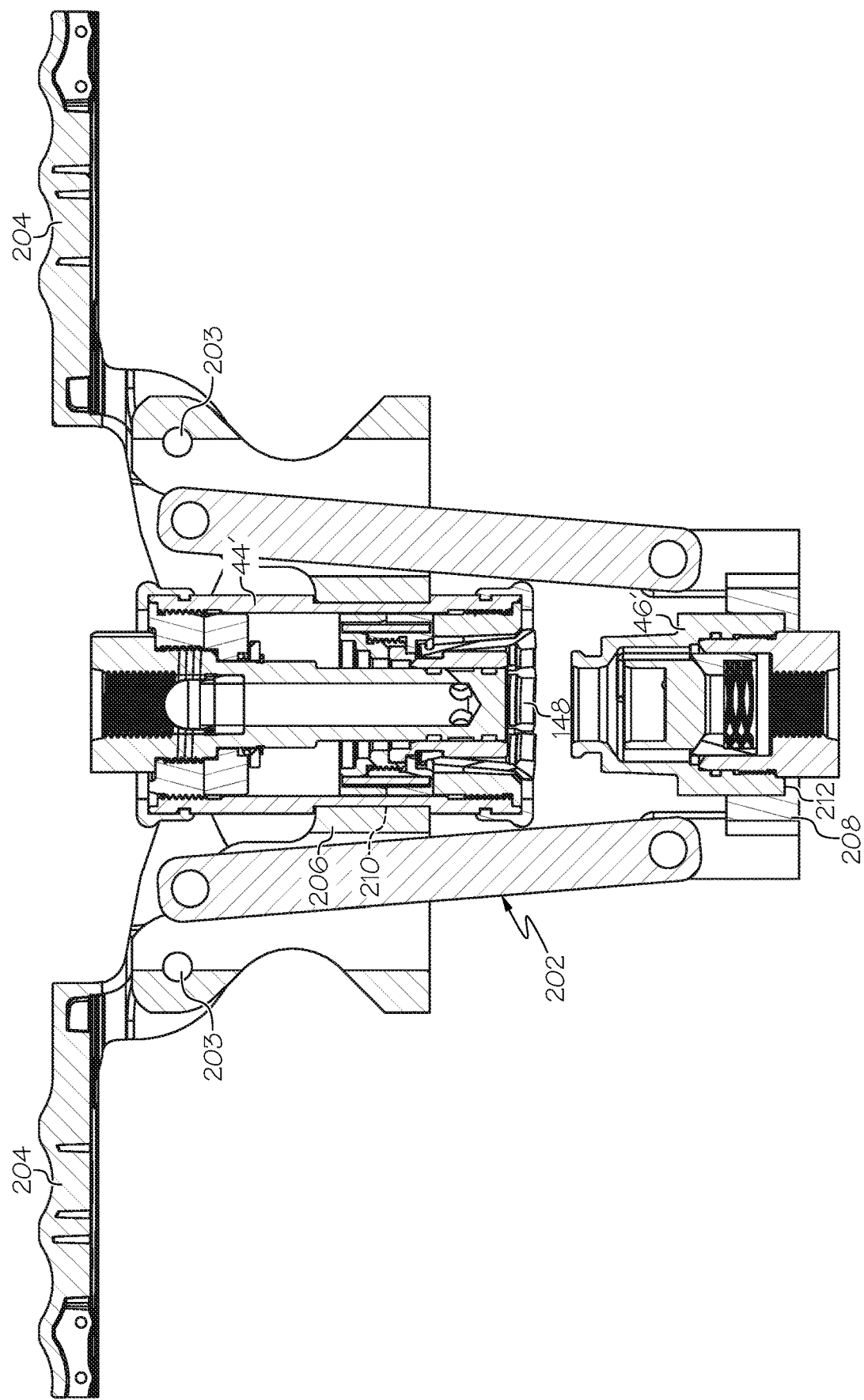
FIG. 21 is a side cross sectional view of the breakaway assembly of FIG. 17, shown in conjunction with a reconnection tool.

In order the couple the connectors 44', 46' and move the assembly 42' to its connected configuration, the connectors 44', 46' may begin in an axially-spaced apart position, as shown in FIGS. 19 and 21. The connectors 44', 46' are then axially moved together and the second connector 46' engages the slider 152 (FIG. 18) and moves the slider 152 upstream (uncovering the openings 162 and opening the valve 151) until the magnet unit 43 engages the upstream attraction member 106*a*. Once the second connector 46' is sufficiently axially inserted, the flanges 148 are moved radially inwardly by the angled surfaces 191, placing the spring 182 in tension. The flanges 148 then engage the ramp 190 and are received in the recess 150 to secure the connectors 44', 46' together. Once the connectors 44', 46' are connected and the curtain valve 151 is open, pressurized fluid flows into the downstream connector 46' and opens the poppet valve 80' therein due to the pressure exerted by the fluid on the poppet valve 80', as shown in FIG. 17.

Figure 22:
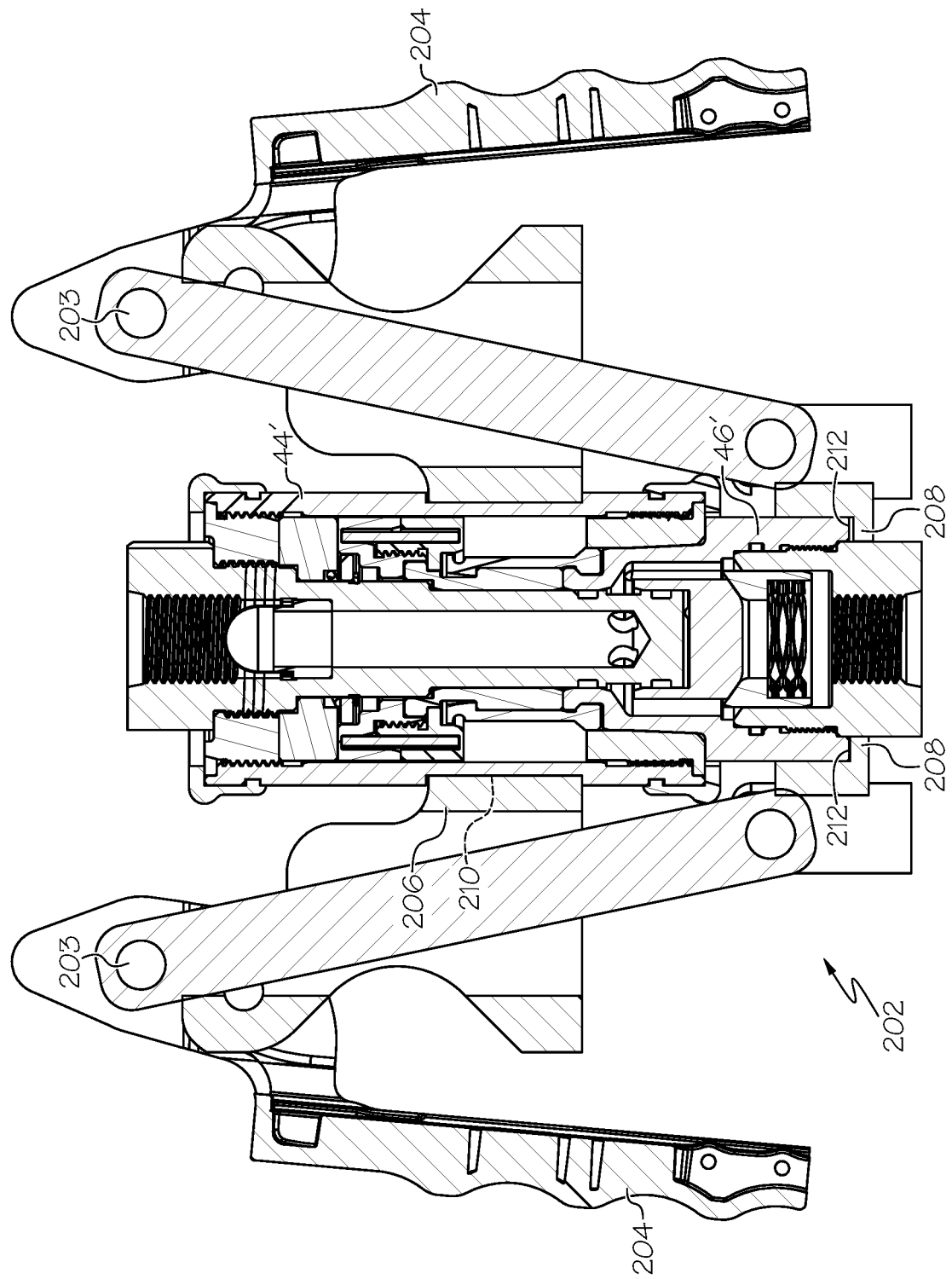
FIG. 22 is a side cross sectional view of the breakaway assembly of FIG. 21, shown in its connected configuration.

In order to move the assembly 42' from its disconnected configuration of FIG. 19 to its connected configuration of FIG. 17, in one case a reconnection tool 202 as shown in FIGS. 21 and 22 may be utilized. The connection tool 202 includes a pair of manually operable handles 204 that are operable coupled, via various linkages and pivot connections, to a first coupler 206 and a second coupler 208. The first coupler 206 is a generally annular component configured to closely fit in a recess 210 on an outer surface of the first connector 44'. The second coupler 208 is a generally annular component configured to fit over a lip 212 of the second connector 46'.

When the connection tool 202 is in the configuration shown in FIG. 21, and the handles 204 are oriented in a radial direction the first coupler 206 and second coupler 208 are relatively axially spaced apart. The connection tool 202 is then operated such that the handles 204 are pivoted about their pivot points 203 until they handles 204 are oriented in an axial direction, and the first coupler 206 and second coupler 208 are moved axially closer together, as shown in FIG. 22, thereby pulling the second connector 46' into the first connector 44' as outlined above. In some cases the tool 202 may be provided to only certified trained personnel to ensure the connection and reconnection process is completed properly and that the system is properly inspected before and after separation.

When the slider 152 is in its downstream position (FIGS. 18 and 19), the magnet unit 43' magnetically interacts with, and is thus magnetically coupled to, the downstream attraction member 106*b*. The downstream attraction member 106*b* thus acts as a security measure to lock the slider 152/curtain valve 151 in its closed position, and requires a predetermined force to move the slider 152 away from the downstream position. In particular, the magnet unit 43' and attraction member 106*b* together ensure that a sufficiently high force is required to return the slider 152/curtain valve 151 to its open position so that only authorized/sufficiently trained personnel can reconnect the assembly 42'. This can help to ensure that the assembly 42' is properly assembled and that the parts are in good working order. In one case, the force required to move the slider 152/curtain valve 151 away from its downstream position is about 200 lbs., or greater than the separation force in one case, or greater than about 25% the separation force in one case, or less than the separation force in one case, or less than about 50% of the separation force in another case. However, the inclusion of the attraction member 106*b* is optional and the attraction member 106*b* can be omitted if desired.

In some cases, the downstream connector 46' may include a vent 200 (FIG. 19) in the form of a relatively small opening that provides fluid communication between the fluid path inside the downstream connector 46' (downstream of the poppet valve 80') and the ambient atmosphere. In this case after a separation event when the poppet valve 80' of the downstream connector 46 is closed, the vent 200 allows for a controller release of fluid that may be trapped by the poppet valve 80' to reduce pressure in the system.

The assembly 42' of FIGS. 17-22 provides a robust and reliable shut-off valve in which the sealing functionality is provided by the sealing structure 156 of the slider 152 extending over and sealing the openings 162 of the center shaft 158. In this case the sealing surfaces are entirely positioned inside the assembly 42' in both the connected and unconnected states of the assembly 42' and protected from external forces, and from dirt/debris. The slider 152/curtain valve 151 allows flow or shuts off flow from radially outside the fluid path 32/cavity 160, as the slider 152 seals on the outer surface/diameter of the center shaft 158. The existence of pressure in the cavity 160 of the center shaft 158, when the slider 152/curtain valve 151 is closed, exerts a force radially outwardly. However the slider 152/curtain valve 151 is moveable axially between its open and closed positions. Thus the existence of radially exerted pressure in the cavity 160/center shaft 158 does not affect operation of the slider 152/curtain valve 151, and the curtain valve 151 is thereby pressure balanced when the slider 152 is in its downstream/closed position, and the pressure of the fluid does not tend to either open or close the curtain valve 151. In this case an external force is required to open or close the slider 152/curtain valve 151. In addition, when the slider 152 is in its downstream position both seals 164, 166 engage the slider 152 to thereby trap/close the openings 162 for a strong seal. The curtain valve 151 thus reduces susceptibility to force spikes, although the assembly 42' can include force-spike accommodation features as will be described below.

As noted above, the seals 164, 166 are captured and internally positioned so that they resist removal. In contrast, in certain other designs the seals can be blown out of position during a separation event, and the person who reconnects the assembly may not notice the missing seals. However, the present design minimizes the chance for displacement of the seals 164, 166. Moreover, the angled surfaces 180 on the flanges 148 that axially connects the two connectors 44', 46' faces radially inwardly and are protected from damages. The corresponding angled ramp 190 faces radially outwardly but is also protected from damage when the assembly 42' is in its connected configuration, and in addition the ramp 190 is easily visible for inspection after a separation event to ensure the ramp 190 is not damaged.

In addition, the magnet unit 43' is directly coupled to the slider 152/curtain valve 151, which provides a quicker response in terminating the flow of fluid. Many current systems rely on pressure, flow and a biasing spring to close a check valve or the like. In those cases, if there is any debris in the fluid path 32 the valve can be held open and/or slow to close. In contrast, the assembly 42' has no or little surfaces (e.g. surfaces that are perpendicular to the direction of the flow) that debris can collect on to prevent the valve 151 from closing, since the slider 152 is slidably positioned on, and slides axially over, the center shaft 158. In addition any debris positioned on the center shaft 158 can be displaced and cleaned away by axial sliding of the slider 152 to provide a self-cleaning design.

The assembly 42' and in particular the slider 152/curtain valve 151 design provides a component in which, when the assembly 42' is in its connected configuration, a relatively low number of parts in the upstream connector 44' are exposed to pressure; e.g. the slider 152, both seals 164, 166, the upstream threaded adapter 48, the center shaft 158 and internal components of the downstream connector 46'. After a separation event, when the curtain valve 151 is closed, the only components of upstream connector 44' exposed to pressure due to pressurized fluid therein are the slider 152, the valve 151, the center shaft 158 and the upstream threaded adapter 48. Thus by providing a relatively low number of parts exposed to pressure, the chances of a loss of pressure are reduced, and cost and complexity of the assembly 42' can also be reduced.

As noted above, the angled engaging surfaces 180, 190 that transmit the separation force are similarly internally positioned and protected in both states of the assembly 42'. Finally, the flow path through the assembly 42' is relatively straight with relatively little turns and change-of-direction provided to the fluid, which reduces pressure forces, reduces wear and tear on the assembly 42', and presents less opportunities for clogs or flow obstructions.

Pressure-Spike Accommodation—High Pressure

Pressurized fuels may be exposed to pressure spikes due to, for example, connection of the fluid path to a compressor which causes pressure fluctuation during operation of the compressor. Pressure spikes may also occur when an operator jerks on the hose 16. Since the fluid is compressible, but under relatively high pressure, shock waves (which can come from an upstream source such as a compressor or pump) may propagate through the system relatively quickly, presenting a high pressure spike over a relatively short period of time.

During a pressure spike event of the assembly 42' of FIGS. 17-20, since the assembly 42' is pressure balanced as described above, a fluid-based pressure spike may not directly lead to or cause separation of the assembly 42'. Instead, a fluid-based pressure spike from an upstream source may instead apply increased pressure to the seals 164, 166. The seals 164, 166 may become temporarily comprised and release or "burp" pressure or fluid into the surrounding volumes, such as inner cavity 155 of the shaft member 153. It is possible that sufficient burping of fluid or pressure could eventually build up to a degree that relatively strong separation forces are applied to the assembly 42'. In addition, an external separation forces, such as a user pulling on the hose 16 can impart separation forces that may need to be accommodated. Thus the pressure-spike/separation force accommodation features outlined above, such as the floating magnet unit 43' and/or floating attraction member 106a, 106b may be utilized in the assembly 42' of FIGS. 17-20.

Figure 20:
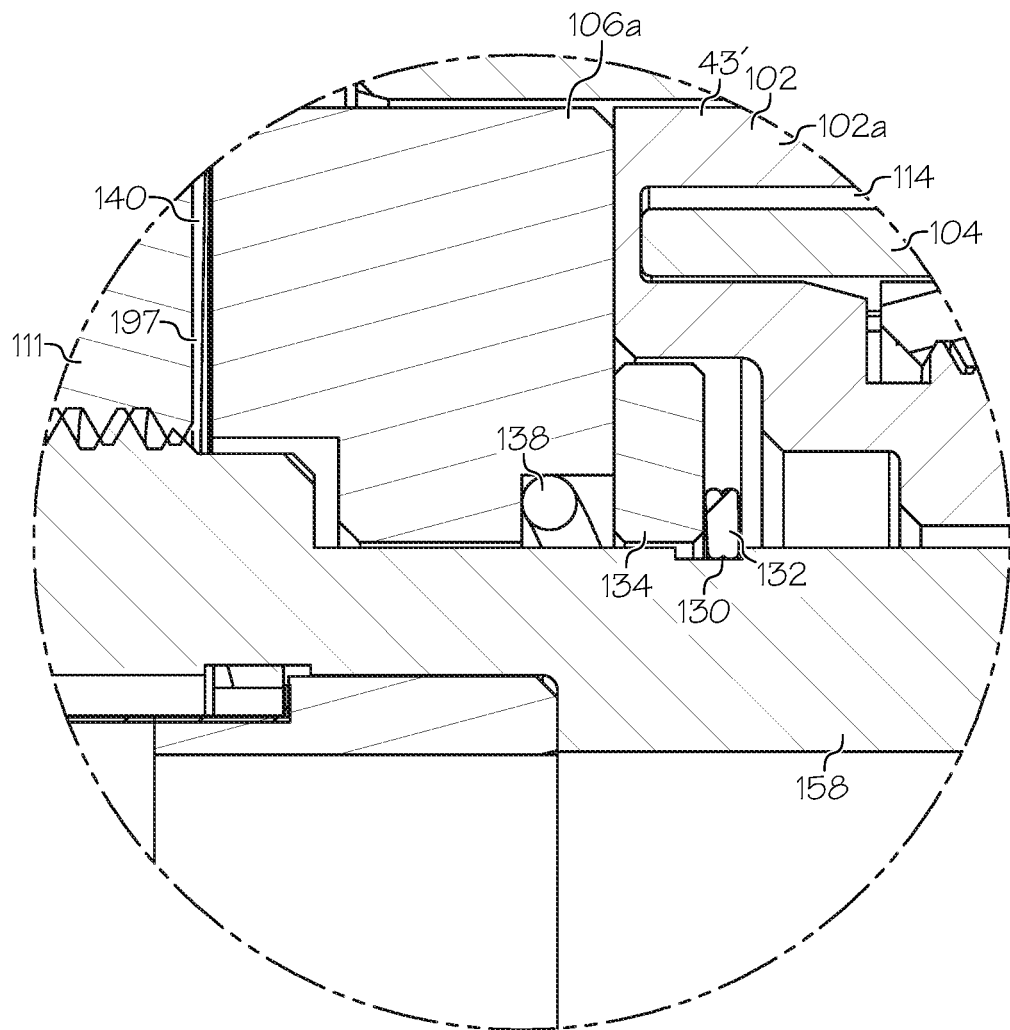
FIG. 20 is a detail cross section of the area indicated in FIG. 17, shown accommodating a force spike.

In particular, as shown in FIGS. 17 and 20, the center shaft 158 of the upstream connector 44' may have a retaining ring 132 received in a recess 130 on an outer surface thereof, retaining the washer 134 in place. When in the coupled arrangement and not accommodating a pressure spike, as shown in FIG. 17, an axially-extending gap 195 is positioned between the washer 134 and the attraction member 106a, and the attraction member 106a is biased to the upstream position by spring 138.

When the assembly 42' experiences a pressure spike, the slider 152, magnet unit 43' and attraction member 106a, which remains magnetically coupled to the magnet unit 43', can move slightly downstream relative to the rest of the assembly 42, overcoming the spring force of the resilient component 138 and eliminating the gap 195 as the magnet unit 43' and attraction member 106 move downstream. Such relative movement creates a new gap 197 upstream of the attraction member 106a, as shown in FIG. 20, and compresses the spring 138. When in the pressure spike accommodating position of FIG. 20, if a sufficient separation force is applied to the assembly 42', the magnet unit 43' and slider 152 will separate from the attraction member 106a and move downstream, and the assembly 42' will move to the configurations shown in FIGS. 18 and 19. However assuming that no separation force is experienced, once the pressure spike force is dissipated, the assembly 42' will return to its position shown in FIG. 17, as biased by the spring or resilient component 138 which seeks to expand back to its original position.

The gaps 195 and/or 197 can be relatively small, such as between about 0.005" and about 0.04", and about 0.02" in yet another case since the shocks from a compressor/pump or the like may be relatively short in time. The gaps 195/197 in this case can be relatively small compared to the gap 137 of the embodiment shown in FIGS. 2, 3 and 13 to ensure that there is not movement in the assembly 42' sufficient to pull any seals out of position. However, the gaps 195/197 in the embodiment of FIGS. 17 and 20 may also be large enough (up to about 0.2 inches in some cases) to accommodate downstream movement of the attraction member 106a due to a user jerking on the hose 16 in the same manner that a pressure spike may be accommodated.

Thus, it can be seen that that system described and shown herein can provide a fluid dispensing system that can use magnetic features to provide a separation force; that can use magnetic features to accommodate pressure spikes; that can provide valves that are robust and provide strong sealing features; that can accommodate pressure spikes with features other than magnets, and that provide the various other features and advantages described herein.

Having described the invention in detail and by reference to certain embodiments, it will be apparent that modifications and variations thereof are possible without departing from the scope of the invention.

What is claimed is:

1. A breakaway assembly comprising:
   a first connector;
   a second connector releasably coupleable to said first connector, wherein said assembly is movable between a first configuration in which said first and second connectors are releasably coupled and together define a fluid path through which fluid is flowable, wherein said fluid path includes an at least partially radially extending portion, and a second configuration in which said first and second connectors are not coupled together, wherein said assembly is configured to move from said first configuration to said second configuration when a predetermined separation force is applied to said assembly, wherein one of the first or second connectors has a shaft which defines or includes at least part of the fluid path therein and wherein the at least partially radially extending portion includes or is defined by an opening in the shaft; and
   a closure valve positioned in the one of said first or second connectors, wherein said closure valve is configured to be in an open position when said assembly is in said first configuration to allow fluid to flow therethrough, and to move to a closed position blocking said at least partially radially extending portion of the fluid path when said assembly moves to said second configuration to generally block a flow of fluid therethrough, wherein the closure valve includes a slider that is configured to sealingly engage the shaft to seal the fluid path when the assembly is in the closed position, wherein the assembly is configured to be pressure balanced when the assembly is in the second configuration such that internal pressure-induced force is balanced when the assembly is in the second configuration and pressurized fluid is positioned in the fluid path.

2. The assembly of claim 1 wherein the first and second connectors are configured to move relative to each other in an axial direction when the assembly moves from the first configuration to the second configuration, and wherein the slider is axially slidable along the shaft between the open position and the closed position of the closure valve.

3. The assembly of claim 1 wherein the shaft is hollow and has a plurality of radially-extending openings, each of which is sealed by the closure valve when the closure valve is in the closed position, and each of which is not sealed by the closure valve when the closure valve is in the open position.

4. The assembly of claim 1 wherein the one of the first or second connectors includes a connection structure that is configured to releasably connect the closure valve to the other one of the first or second connectors.

5. The assembly of claim 4 wherein the closure valve is configured to move in an axial direction when moving between the open position and the closed position, and wherein the connection structure is configured to axially move with the closure valve between the open position and the closed position.

6. The assembly of claim 5 wherein the connection structure is configured to couple the first connector and the second connector together when the connection structure is in a first axial position, and to not couple the first connector and the second connector together when the connection structure is in a second axial position.

7. The assembly of claim 4 wherein the connection structure includes an angled surface on said first connector and an angled surface on said second connector, and wherein said angled surfaces are configured to engage each other to retain said assembly in said first configuration until the separation force is applied to said assembly.

8. The assembly of claim 4 wherein the connection structure includes one of: 1) a plurality of axially-extending, circumferentially-spaced flanges; or 2) a recess configured to be engaged by the plurality of flanges, wherein the flanges and recess are configured to engage each other to retain said assembly in said first configuration until the predetermined separation force is applied to said assembly, and wherein the connection structure is configured to axially move with the closure valve when the closure valve moves between the open and closed position.

9. The assembly of claim 8 wherein the connection structure includes the plurality of axially-extending, circumferentially-spaced flanges, and wherein each flange is movable between a radially outer position and a radially inner position by a force applied at a location away a surface of the flange which is configured to engage the recess, wherein when each flange is in the radially inner position each flange is configured to engage the recess sufficiently to retain the assembly in the first configuration, and wherein when each flange is in the radially outer position the flanges do not engage the recess to sufficiently retain the assembly in the first configuration, and wherein each flange is in the radially inner position when the connection structure is in a first axial position, and each flange is in the radially outer position when the connection structure is in a second axial position.

10. The assembly of claim 1 wherein the closure valve is coupled to at least part of a connection structure which is configured to releasably couple the first connector to the second connector, wherein the closure valve is configured to axially move from the open position to the closed position, and wherein the closure valve is configured to be magnetically retained in the open position until the predetermined separation force is applied to the assembly.

11. The assembly of claim 10 wherein the closure valve includes or is coupled to a magnet unit, and wherein the one of the first or second connectors that includes the closure valve also includes an attraction member that is magnetically attracted to the magnet unit to magnetically retain the closure valve in the open position.

12. The assembly of claim 11 wherein the magnet unit includes a first portion and a second portion that together define a channel therebetween, and wherein the magnet unit further includes a plurality of magnets received in the channel.

13. The assembly of claim 1 wherein at least part of one of the first or second connectors is axially movable relative to a remaining portion of the one of the first or second connectors, or is axially movable relative to the other one of the first or second connectors, when the assembly is in the first configuration and while the closure valve remains open, to accommodate force spikes.

14. The assembly of claim 13 wherein the at least part of the first or second connectors is biased to a rest position by a biasing element, and is configured to move axially to an actuated position when accommodating a force spike.

15. The assembly of claim 14 wherein the biasing element is fluidly isolated from the fluid path, and is at least one of a resilient member or a magnet.

16. The assembly of claim 1 wherein the slider is configured to sealing engage the shaft at a location spaced away from an axial end of the slider, and wherein the assembly includes a seal that is configured to sealingly engage the slider on a radially inner surface of the slider to seal the fluid path.

17. The assembly of claim 1 wherein the assembly includes an upstream seal positioned on one axial side of the at least partially radially extending portion, and a downstream seal positioned on the other axial side of the at least partially radially extending portion, wherein the upstream seal and downstream seals are configured to sealingly engage the slider on a radially inner surface of the slider when the assembly is in the second configuration to seal the fluid path.

18. The assembly of claim 1 wherein said assembly is configured to automatically move from said first configuration to said second configuration when the predetermined separation force is applied to said assembly.

19. The assembly of claim 1 wherein the assembly is configured such that any facing or abutting surfaces of the first and second connector, when the assembly is in the first configuration, are fluidly isolated or pressure isolated from the fluid path.

20. The assembly of claim 1 wherein the breakaway assembly is arranged, in the absence of any outside forces, in a configuration in which the assembly is configured to move from said first configuration to said second configuration when a predetermined separation force is applied to said assembly.

21. The assembly of claim 1 wherein the closure valve is configured to not apply any internal forces to cause the assembly to move from said first configuration to said second configuration.

22. The assembly of claim 1 wherein the closure valve includes a pair of seals positioned thereon, wherein both seals are configured to seal the fluid path when the assembly is in the first configuration, and wherein both seals are configured to seal a portion of the fluid path in the one of the first or second connectors when the assembly is in the second configuration.

23. A breakaway assembly comprising:
a first connector;
a second connector releasably coupleable to said first connector, wherein said assembly is movable between a first configuration in which said first and second connectors are releasably coupled and together define a fluid path through which fluid is flowable, and a second configuration in which said first and second connectors are not coupled together, wherein said assembly is configured to move from said first configuration to said second configuration when a predetermined separation force is applied to said assembly; and
a closure valve positioned in one of said first or second connectors, wherein said closure valve is configured to be in an open position when said assembly is in said first configuration to allow fluid to flow therethrough, and to move to a closed position when said assembly moves to said second configuration to generally block a flow of fluid therethrough, wherein at least part of said fluid path is positioned in the closure valve, and wherein a line of contact is formed by any abutting surfaces of the first and second connectors when the assembly is in the first configuration, and wherein the line of contact, along its entire length, is at least one of fluidly isolated or pressure isolated from the fluid path.

24. The assembly of claim 23 wherein said fluid path includes an at least partially radially extending portion, wherein the one of the first or second connectors has a shaft which defines or includes at least part of the fluid path therein and wherein the at least partially radially extending portion includes or is defined by an opening in the shaft, wherein said closure valve is configured to cover the at least partially radially portion when the closure valve is in the closed position, and wherein the closure valve is axially movable along said shaft between said open and said closed positions.

25. The assembly of claim 23 wherein the assembly is configured to be securely retained in the first configuration, and to move from said first configuration to said second configuration when the predetermined separation force is applied to said assembly, and wherein the assembly is manually reconnectable into the first configuration after a separation of the first and second connectors due to the predetermined separation force being applied to the assembly.

26. The assembly of claim 23 wherein the line of contact includes a pair of opposed ends, and wherein each end is entirely spaced away, and at least one of fluid isolated or pressure isolated from, the fluid path.

27. A breakaway assembly comprising:
a first connector;
a second connector releasably coupleable to said first connector, wherein said assembly is movable between a first configuration in which said first and second connectors are releasably coupled and together define a fluid path through which fluid is flowable, and a second configuration in which said first and second connectors are not coupled together, wherein said assembly is configured to move from said first configuration to said second configuration when a predetermined separation force is applied to said assembly; and
a closure valve positioned in one of said first or second connectors, wherein said closure valve is configured to be in an open position when said assembly is in said first configuration to allow fluid to flow therethrough, and to move to a closed position when said assembly moves to said second configuration to generally block a flow of fluid therethrough, and wherein the other one of the first or second connectors is configured to at least temporarily be coupled to the closure valve when the assembly moves from the first configuration to the second configuration to move the closure valve to the closed position.

28. The assembly of claim 27 wherein the closure valve is configured to be positively axially coupled to the other one of the first or second connectors when the assembly is in the first configuration and to not be axially coupled to the other one of the first or second connectors when the assembly is in the second configuration.

\* \* \* \* \*